United States Patent
Sakai

(10) Patent No.: US 7,420,291 B2
(45) Date of Patent: Sep. 2, 2008

(54) SECURITY APPARATUS

(75) Inventor: Naoki Sakai, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 477 days.

(21) Appl. No.: 10/650,829

(22) Filed: Aug. 29, 2003

(65) Prior Publication Data

US 2005/0030168 A1   Feb. 10, 2005

(30) Foreign Application Priority Data

Sep. 3, 2002   (JP)   ............ P.2002-257853

(51) Int. Cl.
*B60R 25/00* (2006.01)
(52) U.S. Cl. ................................. 307/10.2
(58) Field of Classification Search ........... None
See application file for complete search history.

(56) References Cited

U.S. PATENT DOCUMENTS

| | | | | |
|---|---|---|---|---|
| 4,873,530 | A * | 10/1989 | Takeuchi et al. | 343/711 |
| 5,563,453 | A * | 10/1996 | Nyfelt | 307/10.2 |
| 5,828,316 | A * | 10/1998 | DiCroce | 340/825.69 |
| 5,828,317 | A * | 10/1998 | Togashi | 340/825.69 |
| 5,850,174 | A * | 12/1998 | DiCroce et al. | 340/426.28 |
| 6,043,752 | A | 3/2000 | Hisada et al. | |
| 6,246,315 | B1 * | 6/2001 | Thomas et al. | 340/426.14 |
| 6,346,876 | B1 * | 2/2002 | Flick | 340/426.13 |
| 6,400,589 | B2 * | 6/2002 | Abo et al. | 363/65 |
| 6,532,911 | B2 * | 3/2003 | Suzuki et al. | 123/41.14 |
| 6,639,511 | B2 * | 10/2003 | Haruna et al. | 340/426.13 |
| 6,664,888 | B1 * | 12/2003 | Bishop | 340/426.11 |
| 6,927,669 | B2 * | 8/2005 | Tanaka | 340/5.64 |
| 2002/0043024 | A1 * | 4/2002 | Tanaka | 49/13 |
| 2002/0113686 | A1 * | 8/2002 | Carravallah et al. | 340/5.61 |

FOREIGN PATENT DOCUMENTS

| | | |
|---|---|---|
| JP | UM A 5 12319 | 2/1993 |
| JP | A-7-224564 | 8/1995 |
| JP | A-10-67302 | 3/1998 |
| JP | 10-181533 | 7/1998 |

* cited by examiner

*Primary Examiner*—Michael J Sherry
*Assistant Examiner*—Adi Amrany
(74) *Attorney, Agent, or Firm*—Oliff & Berridge, PLC

(57) ABSTRACT

A security apparatus is installed in a vehicle including a door-lock control device for performing a door lock control on the basis of a signal transmitted from a portable transmitter, which a legitimate driver should take along. The security apparatus prevents a theft of the vehicle. The security apparatus includes a receiving circuit, an antenna, and a control circuit. The receiving circuit can receive the signal transmitted from the portable transmitter. The control circuit has a function of switching a security mode on the basis of a reception state of the receiving circuit and a member relating to the door lock control such as a door lock motor.

10 Claims, 15 Drawing Sheets

SECURITY APPARATUS

The present disclosure relates to the subject matter contained in Japanese Patent Application. No. 2002-257853 filed on Sep. 3, 2002, which is incorporated herein by reference in its entirety.

BACKGROUND

The invention relates to a security apparatus, and more particularly, relates to a security apparatus for realizing prevention of theft of a vehicle.

There is such a trend that the number of occurrence of events such as theft of a vehicle and breaking into a vehicle is increasing, which has become a social problem. On this account, in these years, in order to prevent theft of a vehicle, various kinds of security apparatuses have been proposed.

The security apparatus is configured to carry out setting and releasing a security mode for watching out for vehicle theft, and to generate an alarm sound to show a threat behavior against a thief and to notify surrounding people, when opening/closing of a door by unfair means and illegal break-in are detected.

Also, it is desirable that the setting and releasing this security mode are interlocked with lock control of a door on the occasion that a legitimate driver gets on and off a vehicle. Therefore, there are many security apparatuses, which are designed to operate in cooperation with a keyless entry system in which lock control of a door is carried out by a remote operation.

FIG. 14 is a block diagram for schematically showing a main part of a security system in which a conventional security apparatus is employed. In the figure, reference numeral 1 designates a receiver control device. The receiver control device 1 includes a control circuit 2, an EEPROM 3, a receiving circuit 4, and an antenna 5. The EEPROM 3 stores an ID code, which is set to each vehicle. The receiving circuit 4 receives a signal (e.g., a signal including an ID code, a door lock instruction code, or a door unlock instruction code), which is transmitted from a portable transmitter 6, which a legitimate driver should take along, and an antenna 5. The control circuit 2 is connected to a door-lock control device 7 for carrying out lock control of a door through a signal line L1.

When the control circuit 2 receives a signal, which is transmitted from outside through the antenna 5 and the receiving circuit 4, the control circuit 2 judges whether or not a code included in the received signal coincides with an ID code, which has been stored in the EEPROM 3. When the control circuit 2 judges that these codes coincide with each other, the control circuit 2 supplies an instruction code included in the received signal (or a code which is generated on the basis of the instruction code) to the signal line L1 so that the instruction code is to be transmitted to the door-lock control device 7. That is, when the control circuit 2 receives a lock instruction or unlock instruction of a door by a remote operation from the portable transmitter 6, which a legitimate driver should take along, the control circuit 2 is designed to follow those instructions.

When the door-lock control device 7 receives the lock instruction code under such a circumstance that all doors are closed, the door-lock control device 7 energizes a door lock motor such that a current passes through the door lock motor 8 in a direction of an arrow A thereby making all doors be in a lock state while the door-lock control device 7 transmits a set instruction code for setting a security mode to the security apparatus 11 through a signal line L2. In addition, it is possible to carry out judgment of whether or not all doors are closed on the basis of a signal, which can be obtained from a door courtesy switch 9.

Also, when the door-lock control device 7 receives the unlock instruction code transmitted from the receiver control device 1, the door-lock control device 7 energizes the door lock motor 8 to flow a current through the door lock motor 8 in a direction of an arrow B thereby making all doors be in an unlock state and transmits an unset instruction code for releasing the security mode to the security apparatus 11 through the signal line L2.

The security apparatus 11 sets or releases a security mode on the basis of the instruction code transmitted from the door-lock control device 7. In this manner, setting and releasing the security mode is carried out in the form of interlocking with lock control of a door.

Also, a door lock switch 12 and a intruder detection sensor 13 are connected to the security apparatus 11. The door lock switch 12 detects which of lock/unlock states a door lock mechanism is in. The intruder detection sensor 13 detects a person who intrudes into inside of a vehicle. When a door is locked or an intruder is detected under such a circumstance that the security mode is set, an alarm sound generation device 14 is controlled to generate an alarm sound.

JP-A-10-181533 (corresponding to U.S. Pat. No. 6,043, 752)

As described above, the conventional security apparatus 11 sets and releases the security mode on the basis of the set instruction code and the unset instruction code which are transmitted from the door-lock control device 7. However, in order to realize this, the door-lock control device 7 must transmit these instruction codes to the security apparatus 11. That is, there is a necessity that the door-lock control device 7 is functionally interlocked with the security apparatus 11.

However, there are many cases that the security apparatus is mounted at a later time. There are few cases that the door-lock control device 7, which is mounted on a vehicle as a standard equipment, is manufactured to be functionally interlocked with the security apparatus 11. Also, even if the door-lock control device 7 is one, which is manufactured to be functionally interlocked with the security apparatus 11, it is simply manufactured so as to correspond to the security apparatus 11, which is manufactured by a certain specific manufacturer.

On that account, in case of mounting a security apparatus manufactured by other manufacturer than the specific manufacturer on a vehicle, for example, as shown in FIG. 15, it is necessity to provide the following configuration. A portable transmitter 26, which is separated from one for a door lock and is dedicated to a security apparatus 21 is provided. Also, it is necessary to perform setting and releasing the security mode on the basis of a signal transmitted from the portable transmitter 26 to the security apparatus 21.

With this configuration, the security apparatus manufactured by the other manufacturers than the specific manufacturer can be mounted on a vehicle. However, as a matter of course, there occurs a necessity of the portable transmitter 26, which is separated from one for a door lock, and it is necessary to provide an antenna 22 and a receiving circuit (not shown) so as to be able to receive a signal transmitted from the portable transmitter 26. Therefore, there is such a problem that a serious cost increase occurs.

Also, since the security apparatus 21 is not designed to interlock with lock control of a door, when a driver gets on a vehicle, it is necessary for the driver to release the security mode by using the portable transmitter 26 and then to release lock of a door by using the portable transmitter 6. This is because if an order of these operations is reversed, lock of a door is to be released before the security mode is released (i.e., the security mode is still being set) so that an alarm sound is generated.

As described above, there is such a problem that to provide the portable transmitter 26 separated from one for a door lock and is dedicated to the security apparatus 21 causes not only cost increase but alto very bad usability to a user.

SUMMARY

This invention is made in view of the above-described problem. An object of the invention to provide a security apparatus, which can be mounted at a later time, can interlock with lock control of a door, and can realize cost reduction.

In order to accomplish the above-described object, a security apparatus (1) according to an embodiment of the invention, is installed in a vehicle and prevents theft of the vehicle. The security apparatus includes a reception unit for receiving a signal transmitted from a transmitter, and a first mode switch unit for switching a security mode on the basis of a reception state of the reception unit and one of a state of a member of the vehicle relating to a door lock control and change of the state of the member.

DETAILED DESCRIPTION OF THE EMBODIMENTS

Figure 1:
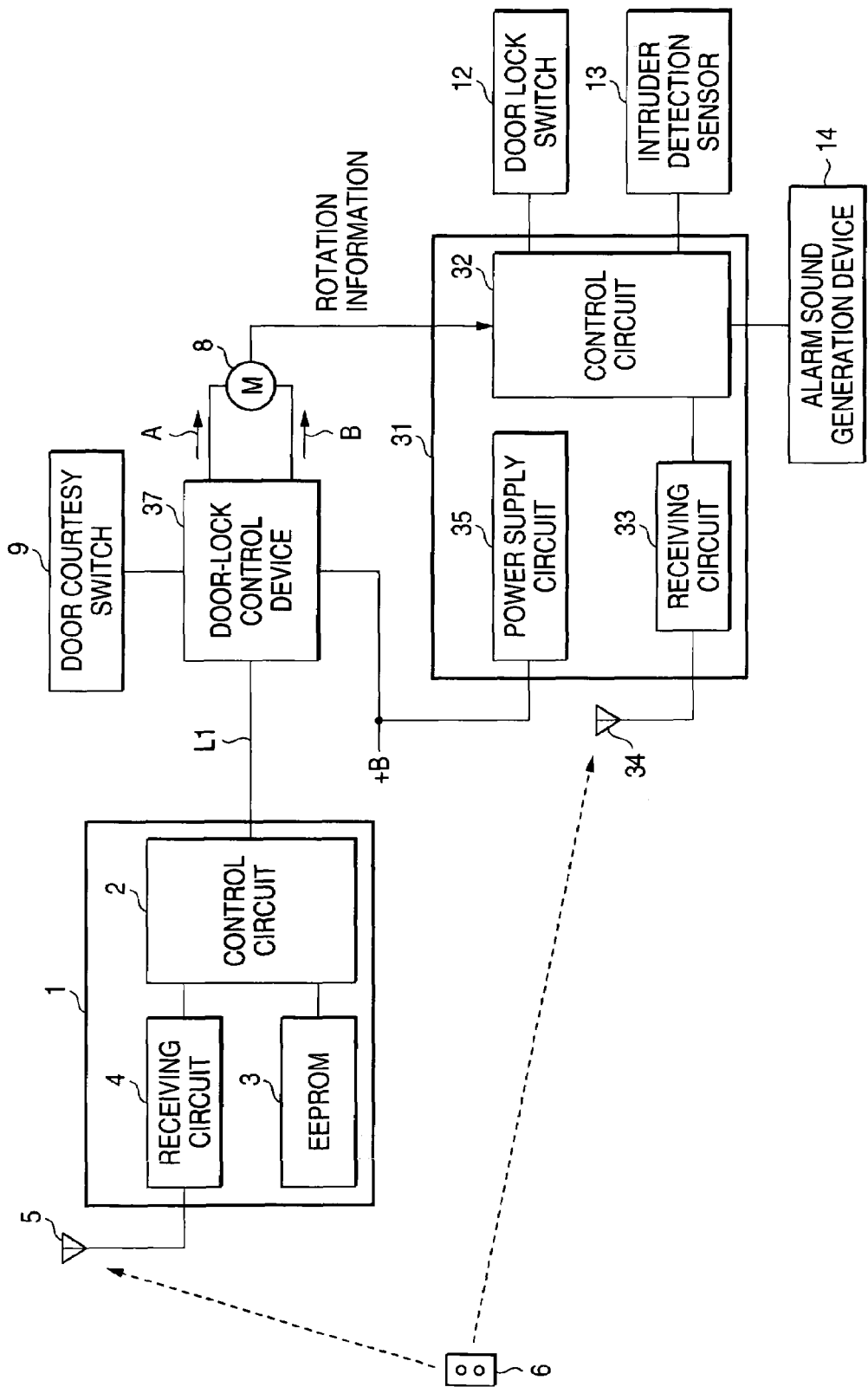
FIG. 1 is a block diagram for schematically showing a main part of a security system in which a security apparatus according to an embodiment (1) of the invention is employed.

As discussed above, a security apparatus (1) according to an embodiment of the invention, is installed in a vehicle and prevents theft of the vehicle. The security apparatus includes a reception unit for receiving a signal transmitted from a transmitter, and a first mode switch unit for switching a security mode on the basis of a reception state of the reception unit and one of a state of a member of the vehicle relating to a door lock control and change of the state of the member.

Preferably, the vehicle may include a door lock control unit for performing the door lock control on the basis of the signal transmitted from the transmitter.

In the security apparatus (1), the security mode is switched on the basis of the reception state of the reception unit (for example, whether or not receiving the signal), and one of a state of a member of the vehicle (for example, a door lock motor) relating to a door lock control and change of the state of the member.

The reception unit can receive the signal transmitted from the transmitter (i.e., a transmitter used for a remote operation of the door lock control). Therefore, for example, when an instruction signal for instructing the door lock control, which was transmitted from the transmitter, reaches the vehicle (i.e., when the lock control of the door is performed on the basis of the instruction signal), the reception unit can receive the instruction signal.

In addition, there are three kinds of signals, which are received by the reception unit, as follows.

a. A signal for instructing lock of the door, which is transmitted from the transmitter.

b. A signal for instructing unlock of the door, which is transmitted from the transmitter.

c. A signal which does not fall under any one of the above-described items a and b.

As above, there is a possibility that the signal, which is received by the reception unit, is a signal corresponding to the item c (i.e., a signal, which does not fall under any one of the items a and b). Therefore, it is not possible to come to a conclusion that the received signal is a signal, which falls under any one of the items a and b, only from information indicating that a signal was received by the reception unit. Accordingly, it is not possible to judge whether or not the instruction signal (a signal, which falls under any one of the items a and b) has been transmitted from the transmitter, only from information indicating that the reception unit receives a signal.

However, as described above, when the instruction signal transmitted from the transmitter reaches to the vehicle, the reception unit can receive the instruction signal. Therefore, it is possible to judge, from information indicating that the reception unit receives a signal, that there is a possibility that the instruction signal has been transmitted from the transmitter. Also, it is possible to judge, from information indicating that the reception unit does not receive a signal, that the instruction signal is not transmitted from the transmitter.

Accordingly, it is possible, from a reception state in the reception unit (e.g., information indicating as to whether or not receiving a signal), to judge presence or absence of a possibility that the instruction signal for instructing the door lock control has been transmitted from the transmitter.

Also, a member relating to the door lock control may include, for example, a locking lever for switching lock/unlock states of a door lock mechanism, a door lock motor (door lock solenoid), a door lock knob, a position switch for detecting which of the lock/unlock states the locking lever is in, and/or a door lock switch for detecting which of the lock/unlock states the door lock mechanism is in.

The locking lever is operable in any one of a case that it is moved by energizing to it so as to rotate in forward/reverse directions, a case that it is manually moved by inserting an ignition key into a door key cylinder, and a case that the door lock knob in the vehicle is moved.

Also, the door lock knob in a vehicle is configured to link with movement of the locking lever. Therefore, even if the locking lever is moved by use of the door lock motor or the ignition key, when the locking lever is moved toward the lock position, the door lock knob in the vehicle is moved toward the lock position, and also, when the locking lever is moved toward the unlock position, the door lock knob in the vehicle is moved toward the unlock position.

Also, for example, when a door lock operation is carried out by a remote operation, current in the forward direction flows through the door lock motor and the door lock motor rotates in the forward direction. Thereby, the locking lever moves toward the lock position (linking with this movement, the door lock knob in the vehicle moves toward the lock position). The door lock mechanism is turned in a lock state. On the contrary, when a door unlock operation is carried out by a remote operation, current in the reverse direction, which is opposite to the forward direction, flows through the door lock motor and the door lock motor rotates in the reverse direction. Thereby, the locking lever moves toward the unlock position (linking with this movement, the door lock knob in the vehicle moves toward the unlock position). The door lock mechanism is turned in an unlock state.

As described above, when the lock/unlock operations are carried out by the remote control, the door lock motor is energized, the door lock motor is rotated, and/or the locking lever and the door lock knob in the vehicle operate.

In other words, from presence or absence of energization of the door lock motor, rotation/stop of the door lock motor, positions of the locking lever and the door lock knob in the vehicle and the like, it is possible to judge whether or not the lock control of the door is being carried out (or was carried or not). That is, from the state of the member relating to the door lock control and the change of the state of the member, it is possible to judge whether or not the lock control of the door is being carried out (or was carried or not).

Accordingly, it is possible to correctly judge whether or not the door lock control is carried out by an remote operation from the transmitter on the basis of the reception state in the reception unit (e.g., the state of receiving a signal) and the state of the member relating to the door lock control (e.g., the state of rotating the door lock motor), or the change of the state of the member (e.g., a fact that a position of the door lock knob in the vehicle is changed).

Thus, according to the security apparatus (1), the security mode is switched on the basis of a result of the correct judgment as to whether or not the door lock is carried out by the remote control from the transmitter. As a result, it is possible to realize appropriate switching of the security mode by interlocking with the lock control of the door.

Also, the security apparatus (1) simply detects the reception state in the reception unit, the state of the member relating to the door lock control, or the change of the state of the member. Therefore, there is no necessity to make the door control device 7 transmit the set instruction code and the unset instruction code, as in the conventional security apparatus 11 (see, FIG. 14). It is possible to easily carry out mounting the security apparatus (1) on the vehicle at a later time. Also, there is no necessity to provide the portable transmitter 26, which is dedicated to the security apparatus 21 as shown in another conventional security apparatus 21 (see, FIG. 15). Therefore, it is possible to realize cost reduction.

Therefore, according to the security apparatus (1), it is possible to mount the security apparatus (1) on the vehicle at a later time. Also, it is possible to make the security apparatus (1) interlock with the lock control of the door. Further, it is possible to realize a security apparatus, which can realize cost reduction.

Also, in a security apparatus (2) according to the embodiment of the invention is, when the first mode switch unit judges that the reception unit receives the signal and the member is in a state of the door lock control toward a lock side, the first mode switch unit sets the security mode. Also, when the first mode switch unit judges that the reception unit receives the signal and the member is in a state of the door lock control toward a unlock side, the first mode switch unit releases the security mode.

In the security apparatus (2), when the first mode switch unit judges that the reception unit receives a signal (i.e., there is a possibility that an instruction signal for instructing door lock control has been transmitted from the transmitter) and that the member is in the state of the door lock control toward the lock side (e.g., a state that the door lock motor rotates in the forward direction), the security mode is set.

On the other hand, when the first mode switch unit judges that the reception unit receives a signal (i.e., there is a possibility that an instruction signal for instructing door lock control has been transmitted from the transmitter) and that the member is in the state of the door lock control toward the unlock side (e.g., a state that the door lock motor rotates in a reverse direction), the security mode is released. Accordingly, it is possible to properly carry out switching of the security mode on the basis of the states of the door lock motor, which moves differently at the time of locking the door lock and at the time of unlocking the door lock, and the states of a door lock solenoid and a locking lever and the like.

Also, in a security apparatus (3) according to the embodiment of the invention is, the first mode switch unit judges that the reception unit receives the signal and the member is in a state of the door lock control, the first mode switch unit switches the security mode.

In the security apparatus (3), when the first mode switch unit judges that the reception unit receives a signal (i.e., there is a possibility that an instruction signal for instructing door lock control has been transmitted from the transmitter) and that the member is in the state of the door lock control (e.g., a state that the door lock motor rotates), the security mode is switched. Therefore, it is possible to properly carry out switching of the security mode on the basis of states of the door lock motor, which operates at the time of door lock control, and states of a door lock solenoid, a locking lever and the like.

Also, a security apparatus (4) according to the embodiment of the invention further includes a first detection unit for detecting variation of a power-supply voltage value supplied from a battery of the vehicle to a door lock control unit of the vehicle for performing the door lock control on the basis of the signal transmitted from the transmitter. When the first detection unit detects the variation of the power-supply voltage value, the first mode switch unit judges that the member is in the state of the door lock control.

The door lock control unit performs drive control of the member relating to the door lock control (e.g., a door lock motor, a door lock solenoid). When the member is driven, the door lock control unit energizes the member. On the occasion of this energization, variation of power-supply voltage value, which is supplied to the door lock control unit, occurs.

According to the security apparatus (4), when the variation of the power-supply voltage value (e.g., change of more than a predetermined value) is detected, it is judged that the member is energized, i.e., the member is in the state of door lock control. Therefore, it is possible to properly carry out judgment as to whether or not the member is in the state of the door lock control.

Also, a security apparatus (5) according to the embodiment of the invention, a second detection unit for detecting variation of a current value supplied from a battery of the vehicle to a door lock control unit of the vehicle for performing the door lock control on the basis of the signal transmitted from the transmitter. When the second detection unit detects the variation of the current value, the first mode switch unit judges that the member is in the state of the door lock control.

As described above, the door lock control unit performs the drive control of the member relating to the door lock control (e.g., a door lock motor, a door lock solenoid). When the member is driven, the door lock control unit energizes the member. On the occasion of this energization, variation of the current voltage value, which is supplied to the door lock control unit, occurs.

According to the security apparatus (5), when the variation of the current value (e.g., change of more than a predetermined value) is detected, it is judged that the member is energized, i.e., the member is in the state of the door lock control. Therefore, it is possible to properly carry out judgment as to whether or not the member is the door lock control.

Also, a security apparatus (6) according to the embodiment of the invention further includes a third detection unit for detecting operation sound of the member. When the third detection unit detects the operation sound of the member, the first mode switch unit judges that the member is in the state of the door lock control.

According to the security apparatus (6), when the operation sound of the member relating to door lock control is detected (e.g., a door lock motor), the first mode switch unit judges that the member is in the state of door lock control. Therefore, it is possible to properly carry out judgment as to whether or not the member is in the state of door lock control or not. In addition, with regard to judgment as to whether or not the detected operation sound is generated from the target member, it is possible to carry out judgment with good precision by taking a sound pressure (magnitude of a sound), a tone color (cycle, frequency) and the like into consideration.

Also, in a security apparatus (7) according to the embodiment of the invention, when the first mode switch unit judges that the reception unit receives the signal and the change of the state of the member indicates the door lock control toward a lock side, the first mode switch unit sets the security mode. Also, when the first mode switch unit judges that the reception unit receives the signal and the change of the state of the member indicates the door lock control toward a unlock side, the first mode switch unit releases the security mode.

According to the security apparatus (7), when the first mode switch unit judges that the reception unit receives a signal (i.e., there is a possibility that an instruction signal for instructing door lock control has been transmitted from the transmitter) and that the change of the state of the member (e.g., movement of the locking lever and the door lock knob in a vehicle toward the lock position) indicates the time of door lock control toward the lock side, the security mode is set.

On the other hand, when the first mode switch unit judges that the reception unit receives a signal (i.e., there is a possibility that an instruction signal for instructing door lock control has been transmitted from the transmitter) and that the change of the state of the member (e.g., movement of the locking lever and the door lock knob in a vehicle toward the unlock position) indicates the door lock control toward the unlock side, the security mode is released. Accordingly, it is possible to properly carry out switching of the security mode on the basis of the change of states of the locking lever, which is in differently states at the time of locking the door lock and at the time of unlocking the door lock, the door lock knob in a vehicle and the like.

Also, a security apparatus (8) according to the embodiment of the invention, the first mode switch unit judges that the reception unit receives the signal and the change of the state of the member indicates the door lock control, the first mode switch unit switches the security mode.

According to the security apparatus (8), when the first mode switch unit judges that the reception unit receives a signal (i.e., there is a possibility that an instruction signal for instructing door lock control has been transmitted from the transmitter) and that the change of the state of the member (e.g., movement of positions of the locking lever and the door lock knob in a vehicle) indicates the door lock control, the security mode is switched. Accordingly, it is possible to properly carry out switching of the security mode on the basis of the change of states of the locking lever, which is in differently states at the time of locking the door lock and at the time of unlocking the door lock, the door lock knob in a vehicle and the like.

Also, a security apparatus (9) according to the embodiment of the invention is installed in a vehicle. The security apparatus prevents theft of the vehicle. The vehicle includes a lock instruction unit for transmitting a signal for instructing a door lock on the basis of a signal transmitted from a transmitter, and a door lock control unit for perform a door lock control on the basis of the signal transmitted from the lock instruction unit. The security apparatus includes a second mode switch unit for switching a security mode on the basis of a state of the transmission from the lock instruction unit and one of a state of a member of the vehicle relating to the door lock control and change of the state of the member.

According to the security apparatus (9), the security mode is switched on the basis of a transmission state from the lock instruction unit (e.g., whether or not a signal for instructing door lock control is transmitted to the door lock control unit from the lock instruction unit), and the state of the member relating to the door lock control (e.g., the door lock motor) or the change of the state of the member.

When an lock operation or an unlock operation of a door is carried out by the remote operation from the transmitter, the signal for instructing door lock control is transmitted to the door lock control unit from the lock instruction unit. Therefore, it is possible to judge as to whether or not the lock (unlock) operation of a door is carried out by the remote operation from the transmitter on the basis of the transmission state from the lock instruction unit.

As described above, it is possible to judge whether or not the lock control of the door is carried out (or was carried out or not) on the basis of the state of the member relating to door lock control or the change of the state of the member.

Accordingly, it is possible to correctly judge whether or not the door lock control is carried out by a remote operation from the transmitter on the basis of a transmission state from the lock instruction unit (e.g., a state that a signal for instructing door lock control is transmitted to the door lock control unit from the lock instruction unit), and the state of the member relating to the door lock control (e.g., a state that the door lock motor rotates), or the change of the state of the member (e.g., a fact that a position of the door lock knob in a vehicle is changed).

Thus, according to the security apparatus (9), the security mode is switched on the basis of a result of the correct judgment as to whether or not the door lock control is carried out by a remote operation from the transmitter. As a result, it is possible to realize appropriate switching of the security mode by interlocking with the lock control of the door.

Also, the security apparatus (9) simply detects the transmission state from the lock instruction unit, the state of the member relating to the door lock control, or the change of the state of the member. Therefore, there is no necessity to make the door control device 7 transmit the set instruction code and the unset instruction code, as in the conventional security apparatus 11 (see, FIG. 14). It is possible to easily carry out mounting the security apparatus (9) on the vehicle at a later time.

Figure 15:
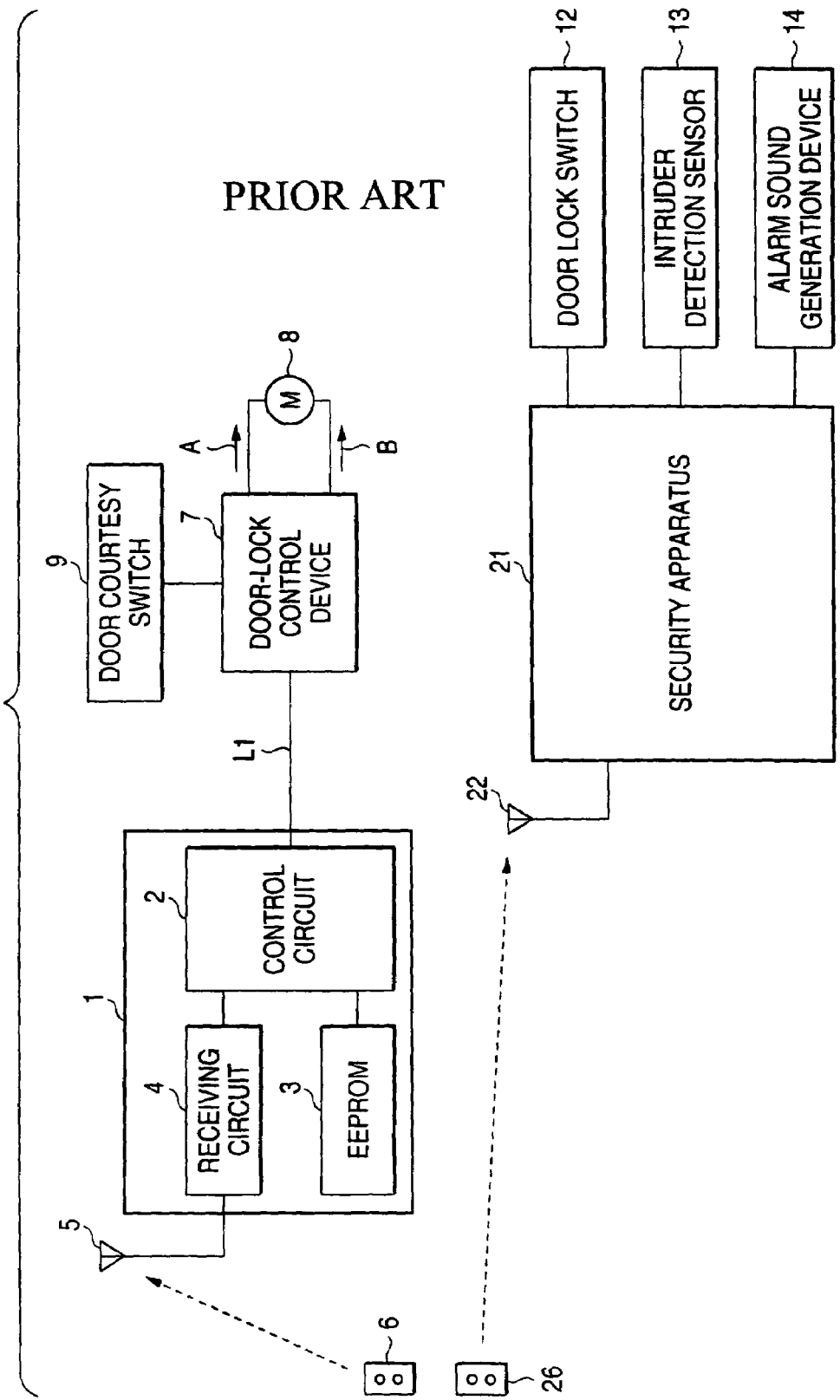
FIG. 15 is a block diagram for schematically showing a main part of a security system in which another conventional security apparatus is employed.

Also, there is no necessity to provide the portable transmitter 26, which is dedicated to the security apparatus 21, as shown in another conventional security apparatus 21 (see, FIG. 15). Further, there is no necessity of the reception unit, which can receive the signal transmitted from the transmitter, as in the security apparatus (1). Therefore, it is possible to realize cost reduction.

According to the security apparatus (9), it is possible to mount the security apparatus (9) on the vehicle at a later time. Also, it is possible to make the security apparatus (9) interlock with the lock control of a door. Further, it is possible to realize a security apparatus, which can realize cost reduction.

Also, a security apparatus (10) according to the embodiment of the invention further includes a fourth detection unit for detecting the signal transmitted from the lock instruction unit. When the second mode switch unit judges that the fourth detection unit detects the signal transmitted from the lock instruction unit and the member is in a state of the door lock control toward a lock side, the second mode switch unit sets the security mode. When the second mode switch unit judges that the fourth detection unit detects the signal transmitted from the lock instruction unit and the member is in a state of the door lock control toward a unlock side, the second mode switch unit releases the security mode.

According to the security apparatus (10), when the second mode switch unit judges that the fourth detection unit detects the signal transmitted from the lock instruction unit (i.e., a signal for instructing door lock control, which is transmitted from the lock instruction unit to the door lock control unit) and that the member (e.g., a state that the door lock motor rotates in a forward direction) is in the state of door lock control toward the lock side, the security mode is set.

On the other hand, when the second mode switch unit judges that the fourth detection unit detects the signal transmitted from the lock instruction unit to the door lock control unit (i.e., a signal for instructing door lock control which is transmitted from the lock instruction unit to the door lock control means) and that the member (e.g., a state that the door lock motor rotates in a reverse direction) is in the state of the door lock control toward the unlock side, the security mode is released. Accordingly, it is possible to properly carry out switching of the security mode on the basis of states of the door lock motor which moves differently at the time of locking the door lock and at the time of unlocking the door lock, and states of a door lock solenoid, a locking lever and the like.

Also, a security apparatus (11) according to the embodiment of the invention further includes a fourth detection unit for detecting the signal transmitted from the lock instruction unit. When the second mode switch unit judges that the fourth detection unit detects the signal transmitted from the lock instruction unit and the member is in a state of the door lock control, the second mode switch unit switches the security mode.

According to the security apparatus (11), when the second mode switch unit judges that the fourth detection unit detects the signal transmitted from the lock instruction unit to the door lock control unit (i.e., a signal for instructing door lock control which is transmitted from the lock instruction unit to the door lock control means) and that the member (e.g., a state that the door lock motor rotates) is in the state of the door lock control, the security mode is set. Accordingly, it is possible to properly carry out switching of the security mode on the basis of states of the door lock motor which operates at the time of door lock control, and states of a door lock solenoid, a locking lever and the like.

Also, a security apparatus (12) according to the embodiment of the invention further includes a first detection unit for detecting variation of a power-supply voltage value supplied from a battery of the vehicle to the door lock control unit. When the first detection unit detects the variation of the power-supply voltage value, the first mode switch unit judges that the member is in the state of the door lock control.

According to the security apparatus (12), when variation of the power supply voltage value (e.g., change of more than a predetermined value) is detected, it is judged that the member is energized, i.e., the member is in the state of door lock control. Therefore, it is possible to properly carry out judgment as to whether or not the member is in the state of door lock control.

Also, a security apparatus (13) according to the embodiment of the invention further includes a second detection unit for detecting variation of a current value supplied from a battery of the vehicle to the door lock control unit. When the second detection unit detects the variation of the current value, the second mode switch unit judges that the member is in the state of the door lock control.

According to the security apparatus (13), when variation of the current value (e.g., change of more than a predetermined value) is detected, it is judged that the member is energized, i.e., the member is in the state of door lock control. Accordingly, it is possible to properly carry out judgment as to whether or not the member is in the state of door lock control.

Also, a security apparatus (14) according to the embodiment of the invention further includes a third detection unit for detecting operation sound of the member. When the third detection unit detects the operation sound of the member, the second mode switch unit judges that the member is in the state of the door lock control.

According to the security apparatus (14), when an operation sound of the member relating to the door lock control (e.g., a door lock motor) is detected, it is judged that the member is in the state of door lock control. Accordingly, it is possible to properly carry out judgment as to whether or not the member is in the state of door lock control. In addition, with regard to judgment as to whether or not the detected operation sound is generated from the target member, it is possible to carry out judgment with good precision by taking a sound pressure (magnitude of a sound), a tone color (cycle, frequency) and the like into consideration.

Also, a security apparatus (15) according to the embodiment of the invention, further includes a fourth detection unit for detecting the signal transmitted from the lock instruction unit. When the second mode switch unit judges that the fourth detection unit detects the signal transmitted from the lock instruction unit and the change of the state of the member indicates the door lock control toward a lock side, the second mode switch unit sets the security mode. When the second mode switch unit judges that the fourth detection unit detects the signal transmitted from the lock instruction unit and the change of the state of the member indicates the door lock control toward a unlock side, the second mode switch unit releases the security mode.

According to the security apparatus (15), when the second mode switch unit judges that the fourth detection unit detects the signal transmitted from the lock instruction unit to the door lock control unit (i.e., a signal for instructing door lock control which is transmitted from the lock instruction unit to the door lock control means) and that the change of the state of the member (e.g., movement of the locking lever and the door lock knob in a vehicle to the lock position) indicates the door lock control toward the lock side, the security mode is set.

On the other hand, when the second mode switch unit judges that the fourth detection unit detects the signal transmitted from the lock instruction unit (i.e., a signal for instructing door lock control which is transmitted from the lock instruction unit to the door lock control means) and that the change of the state of the member (e.g., movement of the locking lever and the door lock knob in a vehicle to the unlock position) indicates the door lock control toward the lock side, the security mode is released. Accordingly, it is possible to properly carry out switching of the security mode on the basis of change of states of the locking lever which is in differently states at the time of locking the door lock and at the time of unlocking the door lock, the door lock knob in a vehicle and the like.

Also, a security apparatus (16) according to the embodiment of the invention, further includes a fourth detection unit for detecting the signal transmitted from the lock instruction unit.

The second mode switch unit judges that the fourth detection unit detects the signal transmitted from the lock instruction unit and the change of the state of the member indicates the door lock control, the second mode switch unit switches the security mode.

According to the security apparatus (16), when the second mode switch unit judges that the fourth detection unit detects the signal transmitted from the lock instruction unit to the door lock control unit (i.e., a signal for instructing door lock control which is transmitted from the lock instruction unit to the door lock control means) and that the change of the state of the member (e.g., movement of positions of the locking lever and the door lock knob in a vehicle) indicates the door lock control, the security mode is switched. Accordingly, it is possible to properly carry out switching of the security mode on the basis of change of states of the locking lever which is in differently states at the time of locking the door lock and at the time of unlocking the door lock, the door lock knob in a vehicle and the like.

Hereinafter, a security apparatus according to an embodiment of the invention will be described on the basis of the drawings. FIG. 1 is a block diagram for schematically showing a main part of a security system in which a security apparatus relating to an embodiment (1) is employed. It should be noted that the same reference numerals and signs are applied to the same structural components as those of the security system shown in FIG. 14, and description thereof will be omitted here.

In the figure, reference 31 designates a security apparatus. The security apparatus 31 includes a control circuit 32, a receiving circuit 33, an antenna 34, and a power supply circuit 35. The control circuit can receive a signal transmitted from the portable transmitter 6 for remotely operating door lock. The power supply circuit 35 is connected to a battery mounted on a vehicle and supplies electric power to the control circuit 32 and the like in the security apparatus 31. In addition, the receiving circuit 33 and the antenna 34 are configured such that a frequency band, which can be received, is widened in order to receive a signal transmitted from a portable transmitter manufactured by any (or almost all) manufacturers. That is, they have versatility.

A door-lock control device 37 energizes the door lock motor 8 on the basis of an instruction from the receiver control apparatus 1 and an opening/closing state of the door, to lock or unlock the door. For example, when the door-lock control device 37 receives a lock instruction code transmitted from the receiver control device 1 under such a circumstance that all doors are closed, the door-lock control device 37 energizes the door lock motor 8 to flow current through the door lock motor in a direction of an arrow A, thereby making all doors be in the locked state. On the other hand, when the door-lock control device 37 receives a unlock instruction code, the door-lock control device 37 energizes the door lock motor 8 to flow current through the door lock motor in a direction of an arrow B, thereby making all doors be in the unlocked state. Also, the battery is connected to the door-lock control device 37. The door-lock control device 37 can perform various process operations using electric power obtained from the battery.

Also, the control circuit 32 of the security apparatus 31 can acquire information indicating as to whether or not the door lock motor 8 rotates and information concerning a rotational direction thereof as rotation information of the door lock motor 8, which is controlled by the door-lock control device 37. In addition, the rotation information can be acquired, for example, by detecting as to whether or not electric power is supplied to the door lock motor 8 or by detecting a direction of a current which flows through the door lock motor 8.

Figure 2:
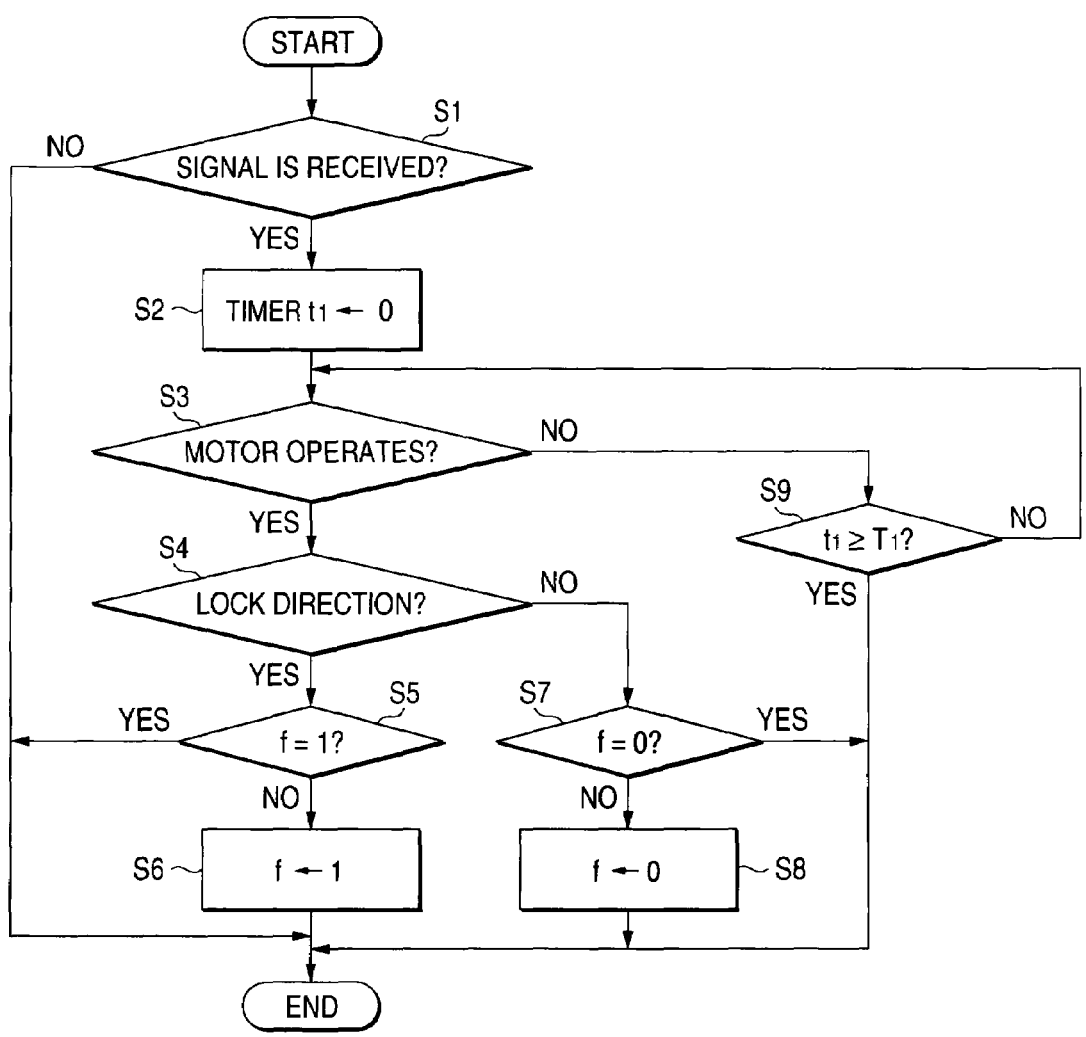
FIG. 2 is a flow chart for showing a processing operation, which is carried out by a control circuit in the security apparatus according to the embodiment (1)

Next, a processing operation (1), which is carried out by the control circuit 32 in the security apparatus 31 according to the embodiment (1), will be described on the basis of a flow chart shown in FIG. 2. Firstly, it is judged as to whether or not the receiving circuit 33 receives a signal (step S1). When it is judged that the receiving circuit 33 has received a signal, that is, there is a possibility that an instruction signal for instructing door lock control has been transmitted from the portable transmitter 6, a timer $t_1$ is set to 0 and is started (step S2). Next, it is judged as to whether or not the door lock motor 8 rotates (e.g., whether or not electric power is supplied to the door lock motor 8) (step S3).

When it is judged that the door lock motor rotates, i.e., the door lock control is carried out, it is judged as to whether or not the door lock motor 8 rotates in a forward direction (a lock direction) (e.g., whether or not a current flows through the door lock motor 8 in a direction of the arrow A) (step S4).

When it is judged that the door lock motor 8 rotates in the forward direction, i.e., the door lock motor 8 is in a state of the door lock control toward a lock side, it is judged as to whether or not a flag f for setting of the security mode is 1 (step S5). When it is judged that the flag f is not 1, the security mode is set by setting the flag f to 1 (step S6). On the other hand, when it is judged that the flag f is 1, i.e., the security mode has already been set, the processing operation (1) is terminated as it is.

On the other hand, in the step S4, when it is judged that the door lock motor rotates not in the forward direction but in a reverse direction, i.e., the door lock motor 8 is in a state of the door lock control toward an unlock side, it is judged as to whether or not the flag f for the setting of the security mode is 0 or not (step S7). When it is judged that the flag f is not 0, the security mode is released by returning the flag f to 0 (step S8). On the other hand, when it is judged that the flag f is 0, i.e., the security mode has already been released, the processing operation (1) is terminated as it is.

Also, in the step S3, when it is judged that the door lock motor 8 does not rotate, it is judged as to whether or not the timer $t_1$ has passed over a predetermined period $T_1$ (e.g., 1 second) (step S9). When it is judged that the timer $t_1$ has passed over the predetermined period $T_1$, a signal received by the receiving circuit 33 is deemed to be a signal transmitted from another transmitter, which is different from the portable transmitter 6. Then, the processing operation (1) is terminated as it is. On the other hand, when it is judged that the timer $t_1$ has not passed over the predetermined period $T_1$, the process returns to the step S3. Subsequently, it is judged again as to whether or not the door lock motor 8 rotates.

According to the security apparatus 31 according to the embodiment (1), when the receiving circuit 33 receives a signal (i.e., there is a possibility that an instruction signal for instructing the door lock control has been transmitted from the transmitter) and it is judged that the door lock motor 8 is rotating in the forward direction (the lock direction), the security mode is set. On the other hand, when the receiving circuit 33 receives a signal and it is judged that the door lock motor is rotating in the reverse direction (the unlock direction), the security mode is released.

Accordingly, the security mode is switched on the basis of a result of correct judgment as to whether or not the door lock control has been carried out by the remote operation from the portable transmitter 6. As a result, it is possible to realize appropriate switching of the security mode by interlocking with the lock control of the door.

Figure 14:
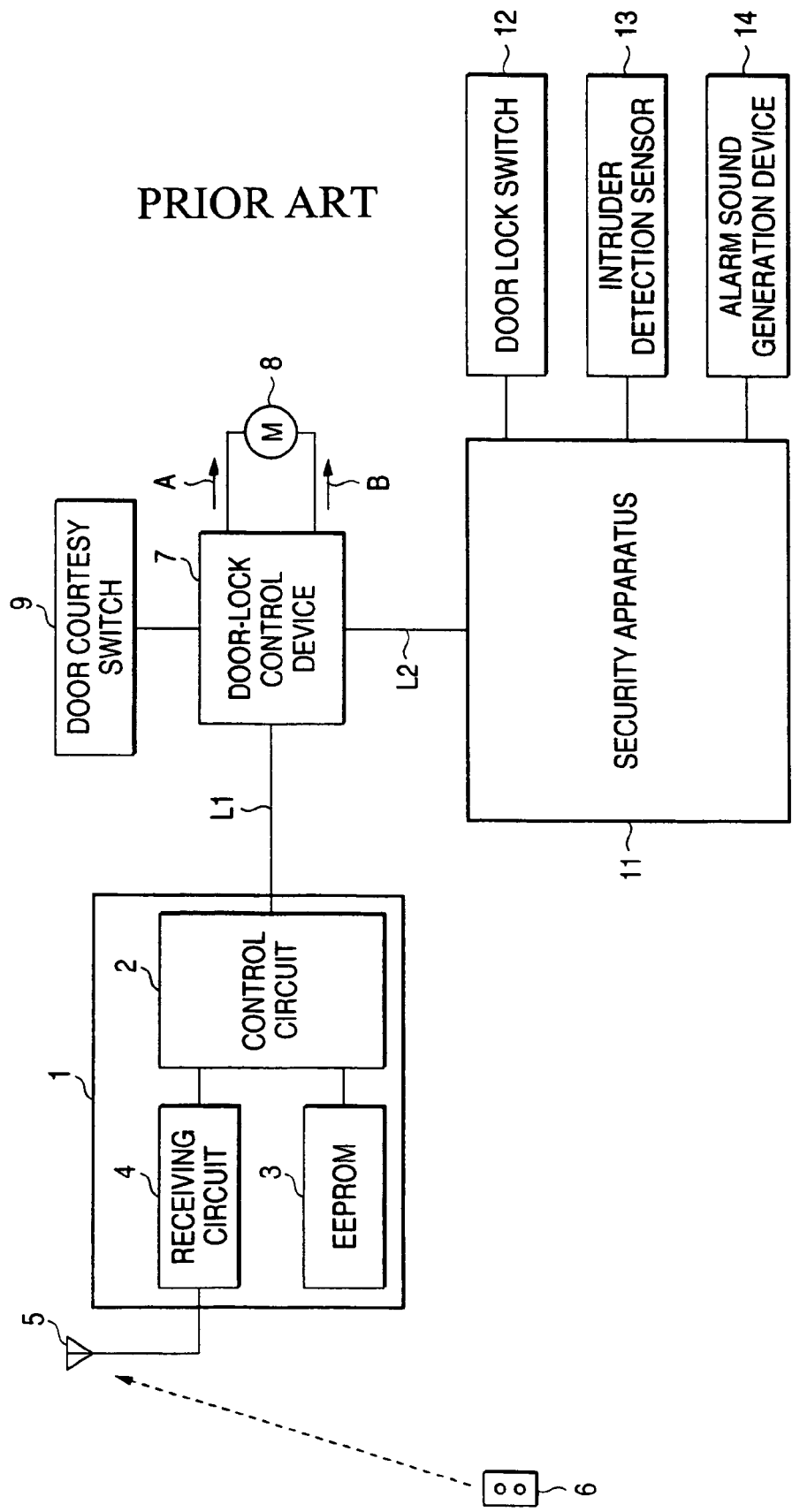
FIG. 14 is a block diagram for schematically showing a main part of a security system in which a conventional security apparatus is employed.

Also, the security apparatus 31 according to the embodiment (1) simply detects a reception state in the receiving circuit 33 and a state of the door lock motor 8. Therefore, there is no need to make the door-lock control device 7 transmit the set instruction code and the unset instruction code as in the conventional security apparatus (FIG. 14). As a result, it is possible to easily carry out mounting the security apparatus 31 on a vehicle at a later time. Also, there is no need to provide the portable transmitter 26, which is dedicated to the security apparatus 21, as in the prior art embodiment described in FIG. 15. As a result, it is possible to realize cost reduction.

Also, in the security apparatus 31 according to the embodiment (1), it is judged as to whether or not the door lock control is carried out and further it is judged whether the door lock control is in the lock side or the unlock side, by detecting an operational state of the door lock motor 8. However, a security apparatus according to another embodiment may detect not the operational state of the door lock motor, but operation states of a door lock solenoid and/or a locking lever, which move differently at a time of locking the door lock and at the time of unlocking the door lock.

Also, the security apparatus 31 according to the embodiment (1), it is judged as to whether or not the door lock control is carried out and further it is judged whether its door lock control is in the lock or the unlock side, by detecting only an operation state of the door lock motor 8, that is, by detecting one member relating to the door lock control. However, a security apparatus according to still another embodiment may carry out these judgments by detecting a plurality of members.

For example, from information as to whether or not the door lock motor 8 is rotating, it may be judged as to whether or not the door lock control is carried out. On the other hand, from information indicating a rotational direction of the locking lever, it may be judged which of the lock side and the unlock side the door lock control is in.

Figure 3:
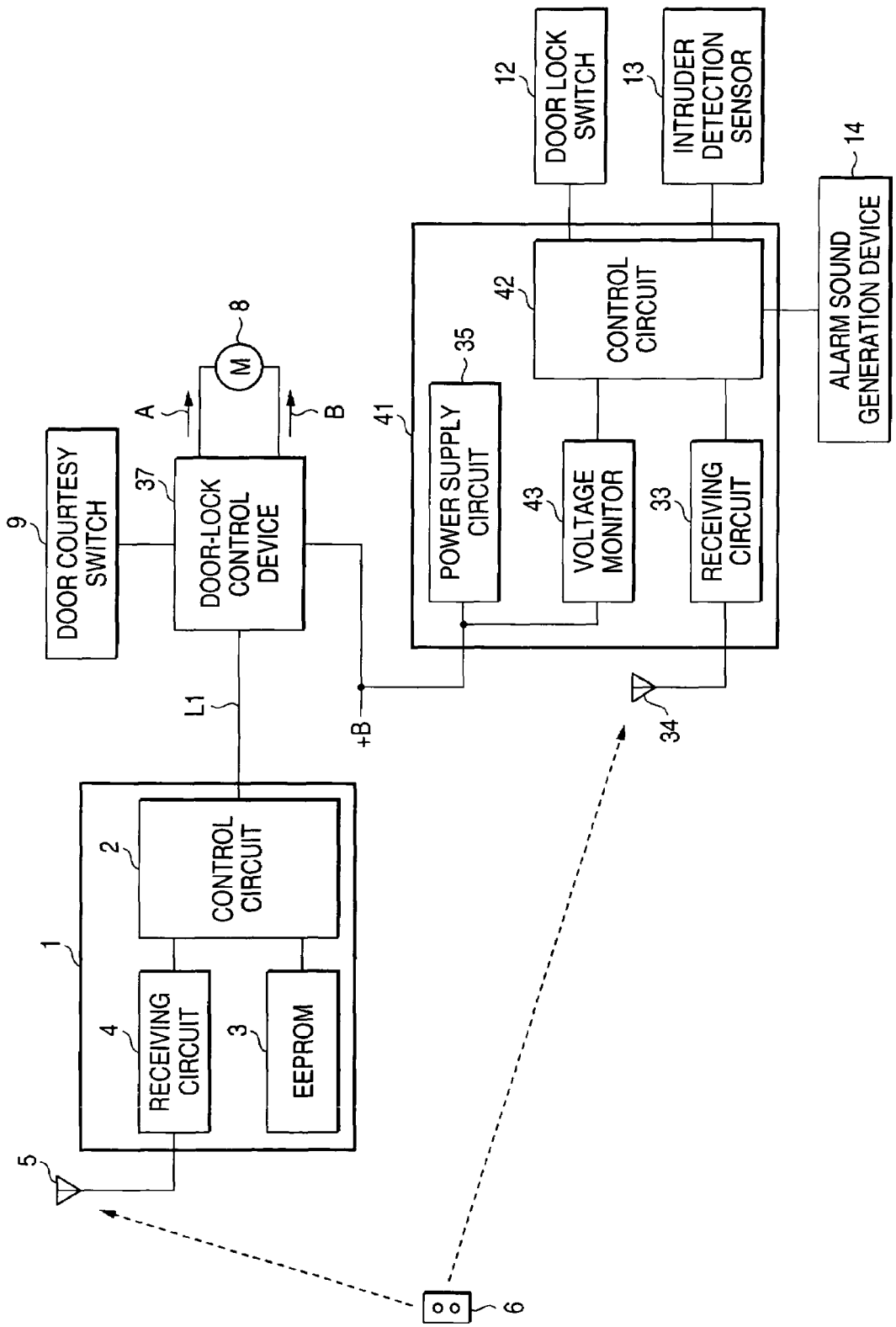
FIG. 3 is a block diagram for schematically showing a main part of a security system in which a security apparatus according to an embodiment (2) is employed.

FIG. 3 is a block diagram for schematically showing a main part of a security system in which a security apparatus according to an embodiment (2) is employed. It should be noted that the same reference numerals and signs are applied to the same structural components as those of the security system shown in FIG. 1, and description thereof will be omitted here.

In the figure, reference numeral 41 designates a security apparatus. The security apparatus 41 includes a control circuit 42, the receiving circuit 33, the antenna 34, the power supply circuit 35, and a voltage monitor 43. The receiving circuit 33 can receive a signal transmitted from the portable transmitter 6 for remotely operating the door lock. The power supply circuit 35 is connected to a battery mounted on a vehicle and supplies electric power to the control circuit 42 and the like in the security apparatus 41. The voltage monitor 43 detects variation of a value of power supply voltage supplied to the door-lock control device 37 (and the security apparatus 41).

Figure 4:
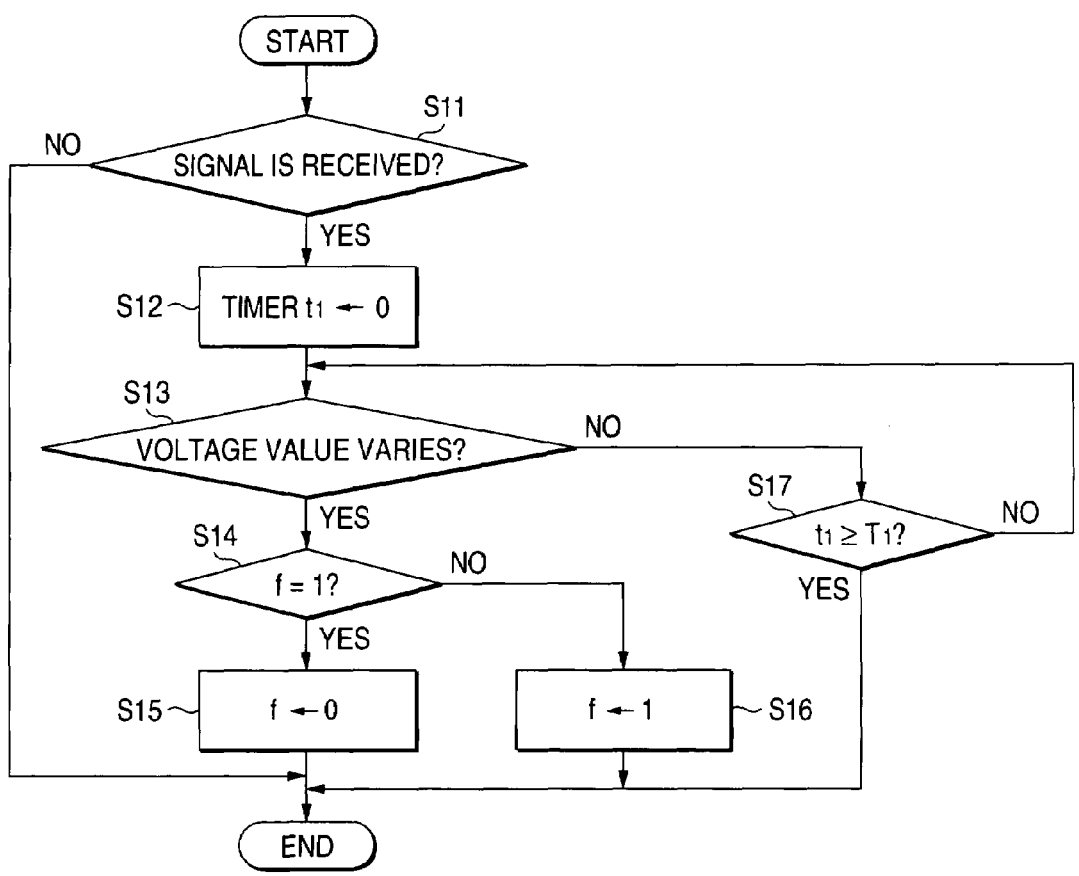
FIG. 4 is a flow chart for showing a processing operation, which is carried out by a control circuit in the security apparatus according to the embodiment (2)

Next, a processing operation (2), which is carried out by the control circuit 42 in the security apparatus 41 according to the embodiment (2), will be described on the basis of a flow chart shown in FIG. 4. Firstly, it is judged as to whether or not the receiving circuit receives a signal (step S11). When it is judged that the receiving circuit 33 receives a signal, i.e., there is a possibility that an instruction signal for instructing door lock control has been transmitted from the portable transmitter 6, a timer $t_1$ is set to 0 and is started (step S12). Next, it is judged as to whether or not a value of the power supply voltage supplied to the door-lock control device 37 varies (for example, change more than a predetermined value) (step S13).

When it is judged that the power supply voltage value varies, this variation is deemed to be caused by energizing the door lock motor 8. Next, it is judged as to whether or not the flag f for setting of the security mode is 1 (step 14). When it is judged that the flag f is 1, the security mode is switched by returning the flag f to 0 to release the security mode (step S15). On the other hand, when it is judged that the flag f is not 1 (that is, 0), the security mode is switched by setting the flag f to 1 to set the security mode (step S16).

Also, in the step S13, when it is judged that the value of the power supply voltage does not vary, it is judged as to whether or not the timer $t_1$ has passed over the predetermined period $T_1$ (e.g., 1 second) (step S17). When it is judged that the timer $t_1$ has passed over the predetermined period $T_1$, the signal received by the receiving circuit 33 is deemed to be a signal transmitted from another transmitter, which is different from the portable transmitter 6. Then, the processing operation (2) is terminated as it is. On the other hand, when it is judged that the timer $t_1$ has not passed over the predetermined period $T_1$, the process returns to the step S13. Then, it is judged again as to whether or not the value of the power supply voltage supplied to the door-lock control device 37 varies.

According to the security apparatus 41 of the embodiment (2), when the receiving circuit 33 receives a signal (i.e., there is a possibility that an instruction signal for instructing door lock control has been transmitted from the portable transmitter 6) and it is detected that the value of the power supply voltage supplied to the door-lock control device 37 varies, the security mode is switched.

Accordingly, the security mode is switched on the basis of a result of correct judgment as to whether or not the door lock is carried out by an remote control from the transmitter 6. As a result, it is possible to realize appropriate switching of the security mode by interlocking with the lock control of the door.

Figure 5:
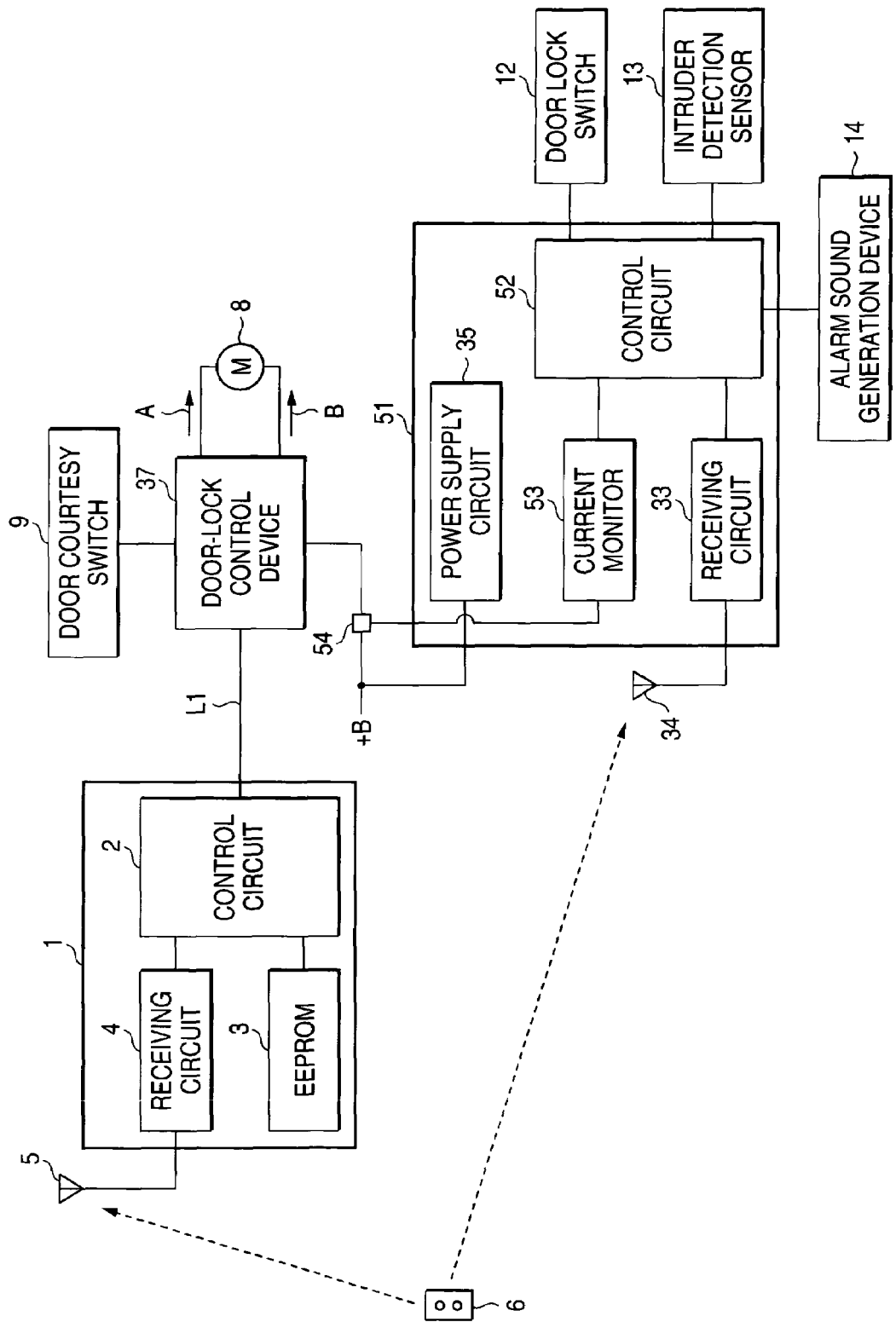
FIG. 5 is a block diagram for schematically showing a main part of a security system in which a security apparatus according to an embodiment (3) is employed.

FIG. 5 is a block diagram for schematically showing a main part of a security system in which a security apparatus according to an embodiment (3) is employed. It should be noted that the same reference numerals and signs are applied to the same structural components as those of the security system shown in FIG. 1, and description thereof will be omitted here.

In the figure, reference numeral 51 designates a security apparatus. The security apparatus 51 includes a control circuit 52, the receiving circuit 33, the antenna 34, the power supply circuit 35, and a current monitor 53. The receiving circuit 33 can receive a signal transmitted from the portable transmitter 6 for remotely operating the door lock. The power supply circuit 35 is connected to a battery mounted on a vehicle and supplies electric power to the control circuit 52 and the like in the security apparatus 51. The current monitor 53 detects variation of a value of a current on the basis of a signal obtained from a current sensor 54 for measuring the value of the current supplied to the door-lock control device 37.

Figure 6:
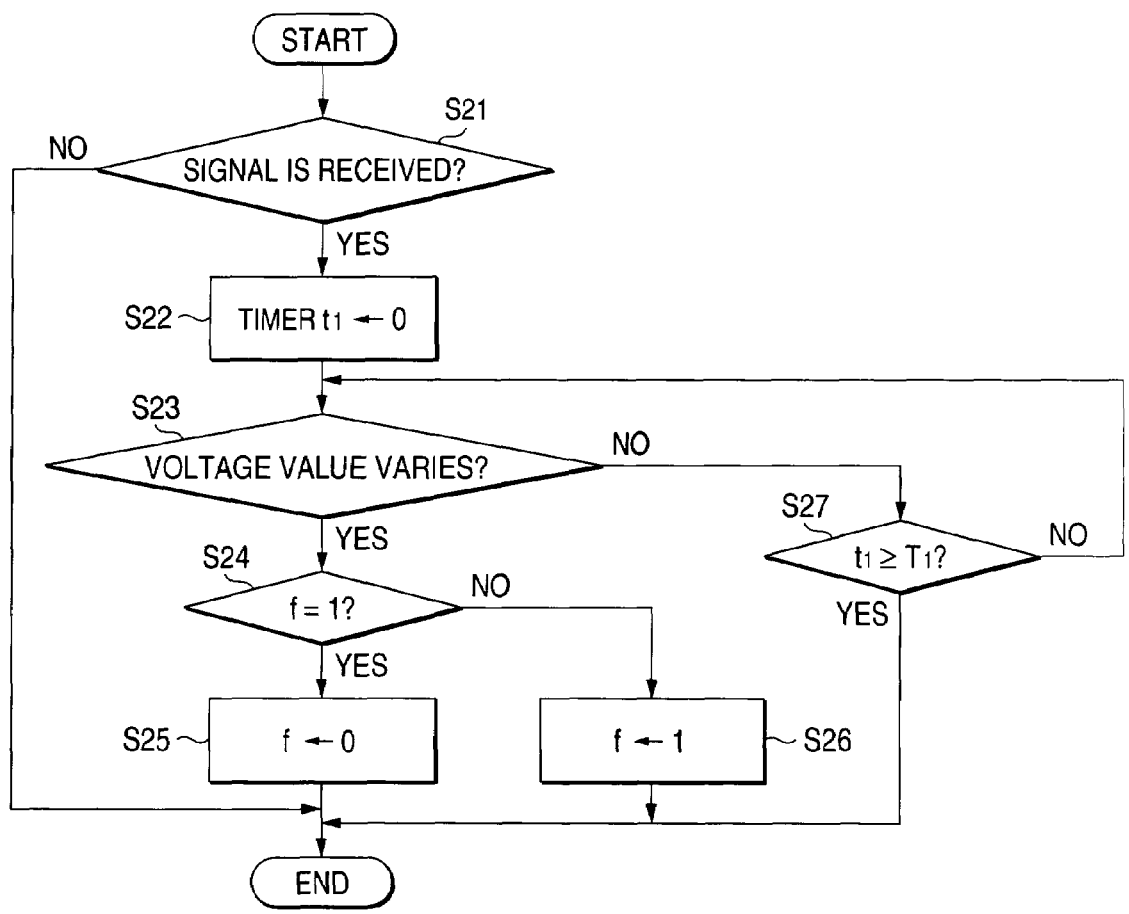
FIG. 6 is a flow chart for showing a processing operation, which is carried out by a control circuit in the security apparatus according to the embodiment (3)

Next, a processing operation (3), which is carried out by the control circuit 52 in the security apparatus 51 according to the embodiment (3) will be described on the basis of a flow chart shown in FIG. 6. Firstly, it is judged as to whether or not the receiving circuit 33 receives a signal (step S21). When it is judged that the receiving circuit 33 receives a signal, i.e., there is a possibility that an instruction signal for instructing door lock control has been transmitted from the portable transmitter 6, the timer $t_1$ is set to 0 and is started (step S22). Next, it is judged as to whether or not the value of the current supplied to the door-lock control device 37 varies on the basis of the signal obtained from the current monitor 43 (step S23).

When it is judged that the current value varies, this variation is deemed to be caused by energizing the door lock motor 8. Next, it is judged as to whether or not the flag f for setting of the security mode is 1 (step 24). When it is judged that the flag f is 1, the security mode is switched by returning the flag f to 0 to release the security mode (step S25). On the other hand, when it is judged that the flag f is not 1 (that is, 0), the security mode is switched by setting the flag f to 1 to set the security mode (step S26).

Also, in the step S23, when it is judged that the current value does not vary, it is judged as to whether or not the timer $t_1$ has passed over the predetermined period $T_1$ (e.g., 1 second) (step S27). When it is judged that the timer $t_1$ has passed over the predetermined period $T_1$, the signal received by the receiving circuit 33 is deemed to be a signal transmitted from another transmitter, which is different from the portable transmitter 6. Then, the processing operation (3) is terminated as it is. On the other hand, when it is judged that the timer $t_1$ has not passed over the predetermined period $T_1$, the process returns to the step S23. Then, it is judged again as to whether the value of the current supplied to the door-lock control device 37 varies.

According to the security apparatus 51 of the embodiment (3), when the receiving circuit 33 receives a signal (i.e., there is a possibility that an instruction signal for instructing door lock control has been transmitted from the transmitter) and it is detected that the value of the current supplied to the door-lock control device 37 varies, the security mode is switched.

Accordingly, on the basis of a result of correct judgment as to whether or not the door lock is carried out by an remote control from the transmitter 6, the security mode is switched. As a result, it is possible to realize appropriate switching of the security mode by interlocking with the lock control of the door.

Figure 7:
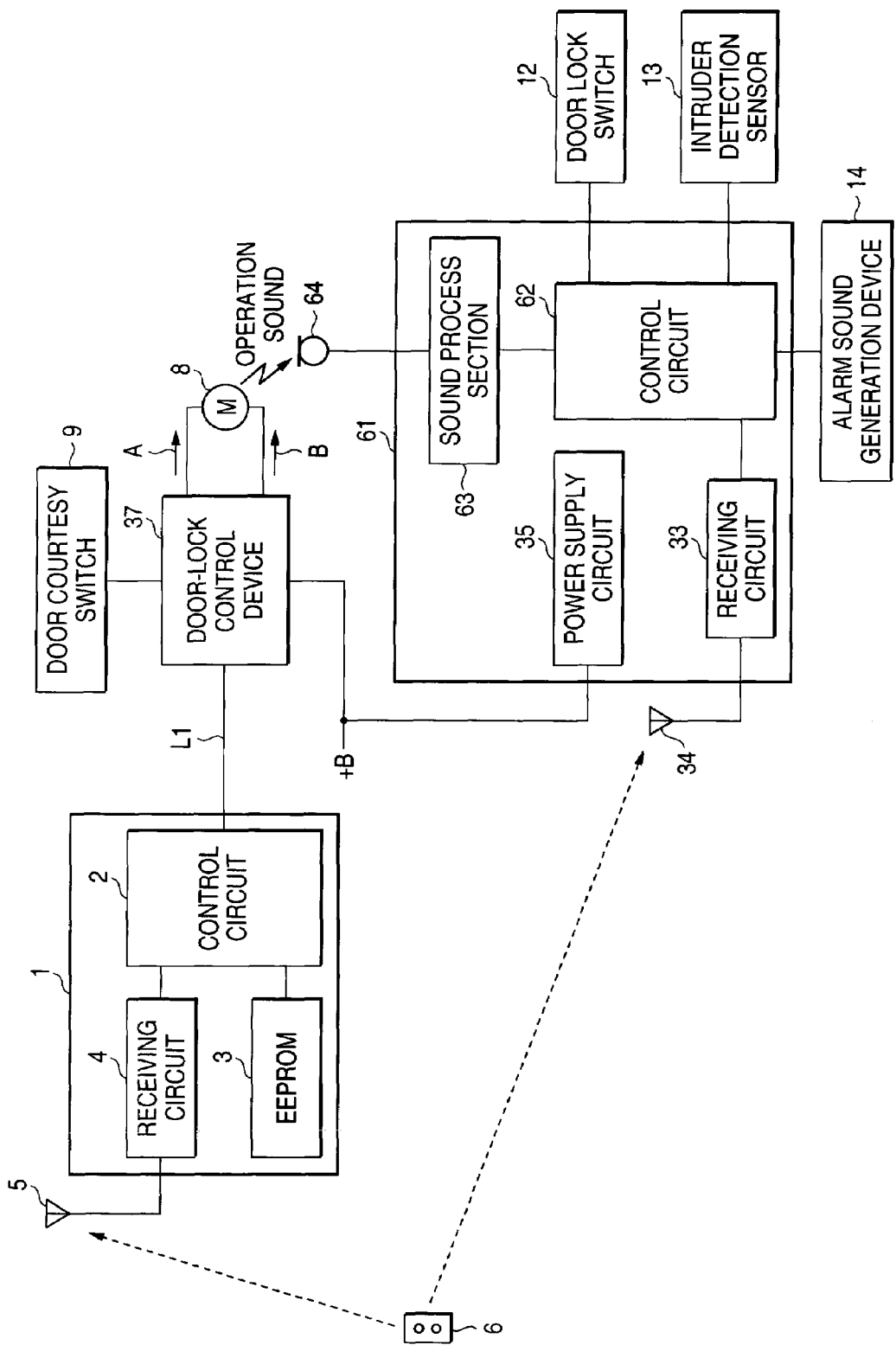
FIG. 7 is a block diagram for schematically showing a main part of a security system in which a security apparatus according to an embodiment (4) is employed.

FIG. 7 is a block diagram for schematically showing a main part of a security system in which a security apparatus according to an embodiment (4) is employed. It should be noted that the same reference numerals and signs are applied to the same structural components as those of the security system shown in FIG. 1, and description thereof will be omitted here.

In the figure, reference numeral 61 designates a security apparatus. The security apparatus 61 includes a control circuit 62, the receiving circuit 33, the antenna 34, the power supply circuit 35, and a sound process section 64. The receiving circuit 33 can receive a signal transmitted from the portable transmitter 6 for remotely operating the door lock. The power supply circuit 35 is connected to a battery mounted on a vehicle and supplies electric power to the control circuit 62 and the like in the security apparatus 61. The sound process section 64 judges as to whether or not an operation sound of the door lock motor 8 is generated on the basis of a signal obtained from a microphone 64 for converting sound into an electric signal to the judgment result to the control circuit 62. In addition, with regard to the judgment as to whether or not sound, which corresponds to the converted electric signal, is an operation sound of the door lock motor 8, the sound process section 63 can perform the judgment with high precision by taking a sound pressure (magnitude of sound), a tone of sound (cycle, frequency) and the like into consideration.

Figure 8:
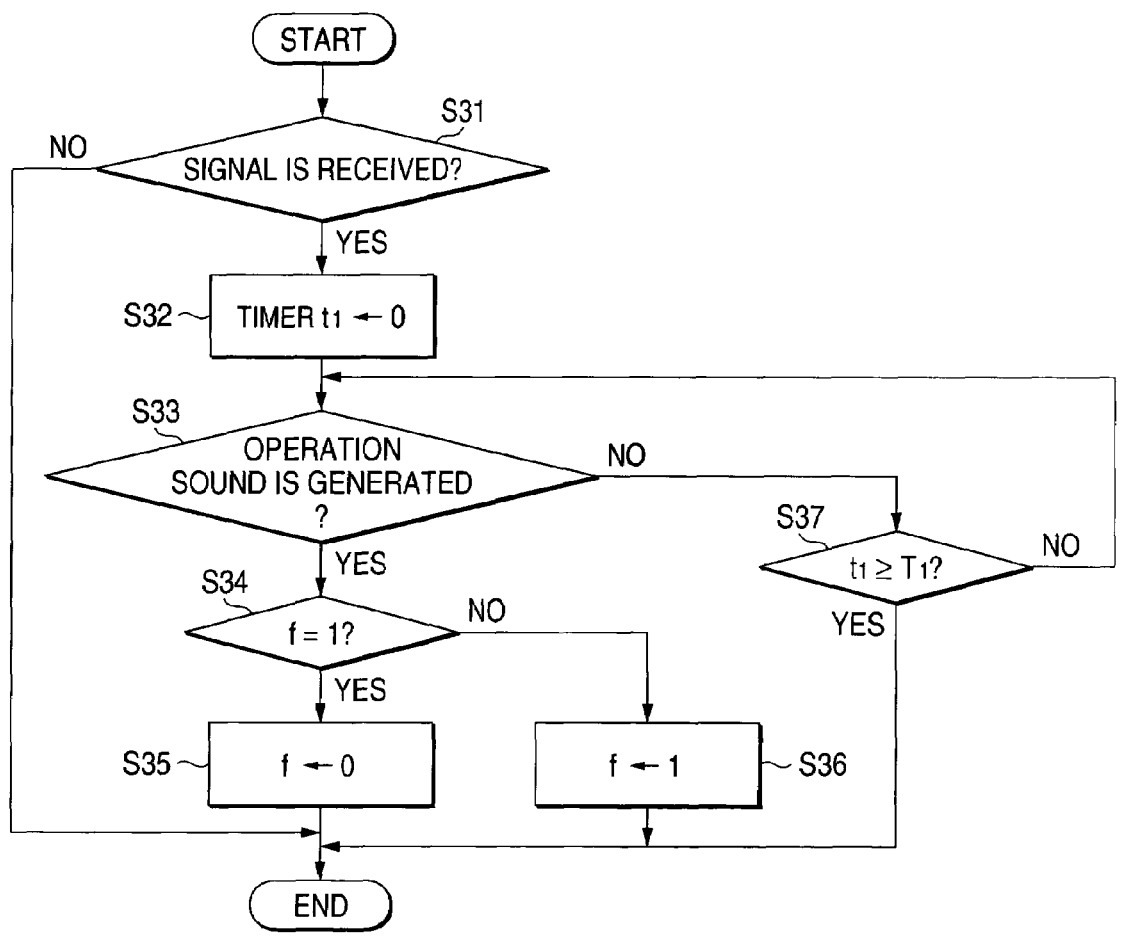
FIG. 8 is a flow chart for showing a processing operation, which is carried out by a control circuit in the security apparatus according to the embodiment (4)

Next, a processing operation (4), which is carried out by the control circuit 62 in the security apparatus 61 according to the embodiment (4), will be described on the basis of a flow chart shown in FIG. 8. Firstly, it is judged as to whether or not the receiving circuit 33 receives a signal (step S31). When it is judged that the receiving circuit 33 receives a signal, i.e., there is a possibility that an instruction signal for instructing door lock control has been transmitted from the portable transmitter 6, the timer $t_1$ is set to 0 and is started (step S32). Next, it is judged as to whether or not the door lock motor 8 operates on the basis of a signal obtained from the sound process section 63 (step S33).

When it is judged that the door lock motor 8 operates, it is judged as to whether or not the flag f for setting of the security mode is 1 (step 34). When it is judged that the flag f is 1, the security mode is switched by returning the flag f to 0 to release the security mode (step S35). On the other hand, when it is judged that the flag f is not 1 (is 0), the security mode is switched by setting the flag f to 1 to set the security mode (step S36).

Also, in the step S33, when it is judged that the door lock motor 8 does not operate, it is judged as to whether the timer $t_1$ has passed over the predetermined period $T_1$ (e.g., 1 second) (step S37). When it is judged that the timer $t_1$ has passed over the predetermined period $T_1$, the signal received by the receiving circuit 33 is deemed to be a signal transmitted from another transmitter, which is different from the portable transmitter 6. Then, the processing operation (4) is terminated as it is. On the other hand, when it is judged that the timer $t_1$ has not passed over the predetermined period $T_1$, the process returns to the step S33. Then, it is judged again as to whether or not the door lock motor 8 operates.

According to the security apparatus 61 of the embodiment (4), when the receiving circuit 33 receives a signal (i.e., there is a possibility that an instruction signal for instructing door lock control has been transmitted from the portable transmitter 6) and an operation sound of the door lock motor 8 is detected, the security mode is switched.

Accordingly, on the basis of a result of correct judgment as to whether or not the door lock is carried out by the remote control from the transmitter 6, the security mode is switched. As a result, it is possible to realize appropriate switching of the security mode by interlocking with the lock control of the door.

In addition, in the security apparatuses according to the embodiments (2) to (4), it is judged as to whether or not the door lock control is carried out by detecting whether or not the door lock motor 8 operates. However, a security apparatus according to another embodiment may detect the operation states of the door lock solenoid, the locking lever and the like.

Figure 9:
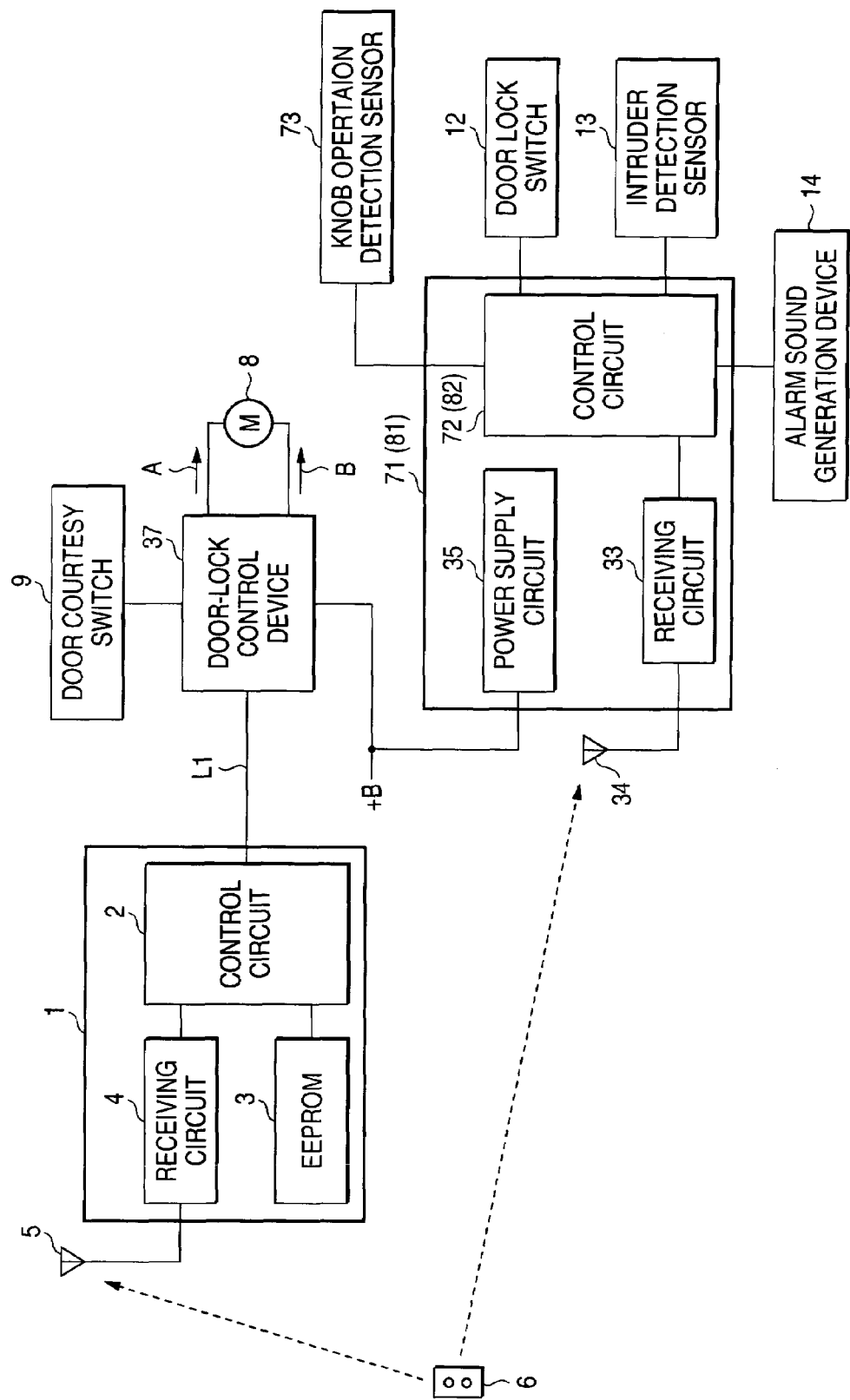
FIG. 9 is a block diagram for schematically showing a main part of a security system in which a security apparatus according to an embodiment (5) is employed.

FIG. 9 is a block diagram for schematically showing a main part of a security system in which a security apparatus according to an embodiment (5) is employed. It should be noted that the same reference numerals and signs are applied to the same structural components as those of the security system shown in FIG. 1, and description thereof will be omitted here.

In the figure, reference numeral 71 designates a security apparatus. The security apparatus 71 includes a control circuit 72, the receiving circuit 33, the antenna 34, and the power supply circuit 35. The receiving circuit 33 can receive a signal transmitted from the portable transmitter 6 for remotely operating the door lock. The power supply circuit 35 is connected to a battery mounted on a vehicle and supplies electric power to the control circuit 72 and the like in the security apparatus 71.

Also, a knob operation detection sensor 73 for detecting movement of a door lock knob in a vehicle is connected to the control circuit 72. The control circuit can grasp movement of the door lock knob in a vehicle. In addition, here, the control circuit 72 can grasp the movement on the basis of a signal obtained from the knob operation detection sensor 73. However, in another embodiment, the control circuit 72 may grasp the movement on the basis of a state of a knob operation interlock switch, which is opened/closed by interlocking with the movement of the door lock knob in the vehicle.

Figure 10:
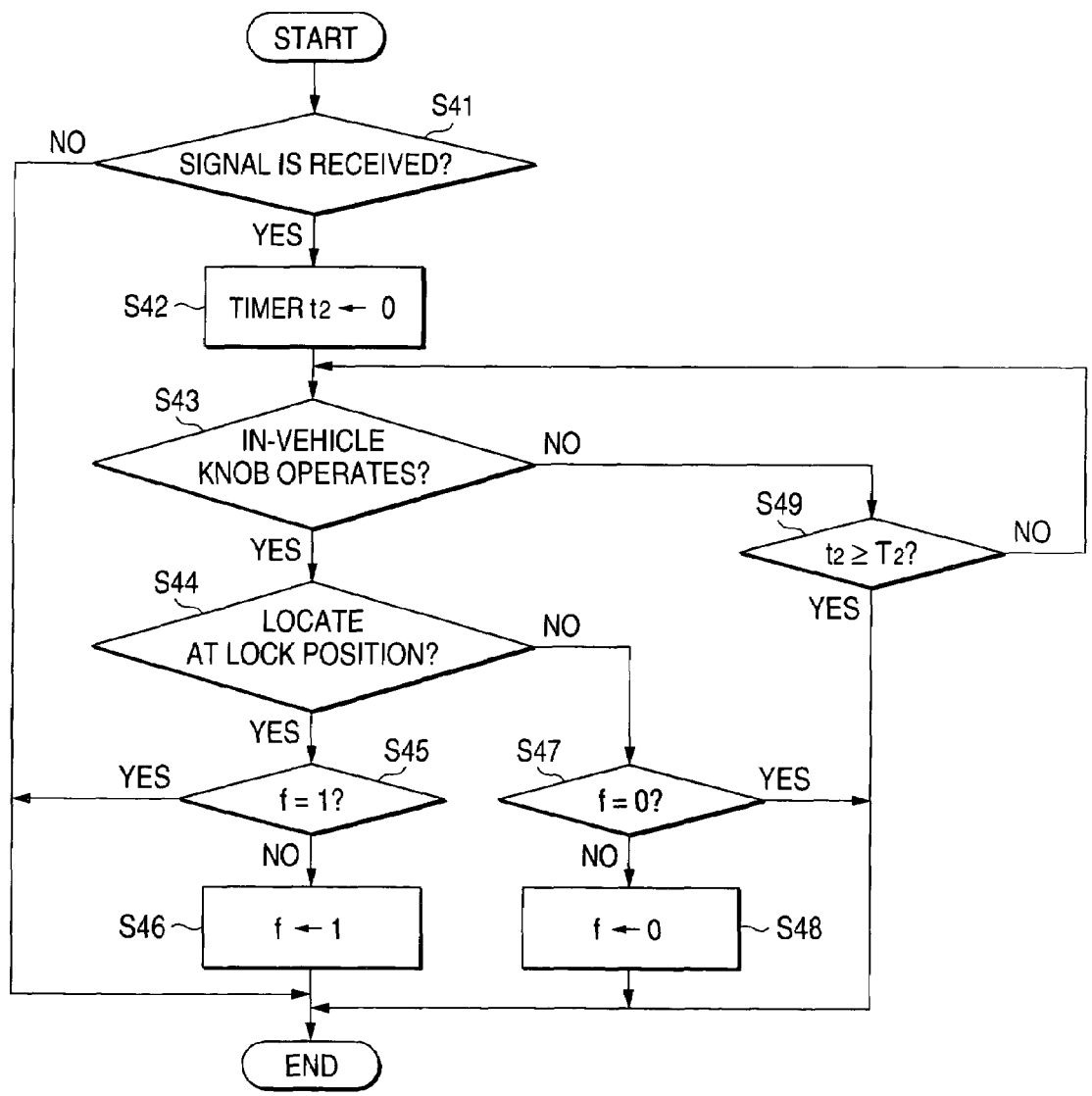
FIG. 10 is a flow chart for showing a processing operation, which is carried out by a control circuit in the security apparatus according to the embodiment (5)

Next, a processing operation (5), which is carried out by the control circuit 72 in the security apparatus 71 according to the embodiment (5), will be described on the basis of a flow chart shown in FIG. 10. Firstly, it is judged as to whether or not the receiving circuit 33 receives a signal (step S41). When it is judged that the receiving circuit 33 receives a signal, i.e., there is a possibility that an instruction signal for instructing door lock control has been transmitted from the portable transmitter 6, the timer $t_2$ is set to 0 and is started (step S42). Next, it is judged as to whether or not the door lock knob, which links with the movement of the locking lever, in a vehicle is moved on the basis of a signal obtained from the knob operation detection sensor 73 (step S43).

When it is judged that the door lock knob in the vehicle is moved, i.e., the locking lever is operated (the door lock control is carried out) by rotation of the door lock motor 8, it is judged as to whether or not the door lock knob in the vehicle is in a lock position on the basis of the signal obtained from the door lock switch 12 (step S44).

When it is judged that the door lock knob is in the lock position, i.e., the door lock knob is moved to the lock position by the door lock control, it is judged as to whether or not the flag f for setting of the security mode is 1 (step 45). When it is judged that the flag f is not 1, the security mode is set by setting the flag f to 1 (step S46). On the other hand, when it is judged that the flag f is 1, i.e., the security mode has already been set, the processing operation (5) is terminated as it is.

On the other hand, in the step S44, when it is judged that the door lock knob in the vehicle is not in the lock position but in the unlock position, i.e., the door lock knob in the vehicle is moved to the unlock position by the door lock control, it is judged as to whether or not the flag f for use in setting a security mode is 0 (step S47). When it is judged that the flag f is not 0, the security mode is released by returning the flag f to 0 (step S48). On the other hand, when it is judged that the flag f is 0, i.e., the security mode has already been released, the processing operation (5) is terminated as it is.

Also, in the step S43, when it is judged that the door lock knob in the vehicle is not moved, it is judged as to whether or not the timer $t_2$ has passed over the predetermined period $T_2$ (e.g., 2 second) (step S49). When it is judged that the timer $t_2$ has passed over the predetermined period $T_2$, the signal received by the receiving circuit 33 is deemed to be a signal transmitted from another transmitter, which is different from the portable transmitter 6. Then, the processing operation (5) is terminated as it is. On the other hand, when it is judged that the timer $t_2$ has not passed over the predetermined period $T_2$, the process returns to the step S43. Then, it is judged again as to whether or not the door lock knob is moved.

According to the security apparatus 71 of the embodiment (5), when the receiving circuit 33 receives a signal (i.e., there is a possibility that the instruction signal for instructing the door lock control has been transmitted from the portable transmitter 6), the security mode is set. On the other hand, when the receiving circuit 33 receives a signal, and movement of the door lock knob to the unlock position is detected, the security mode is released.

Accordingly, on the basis of a result of correct judgment as to whether or not the door lock is carried out by the remote control from the transmitter 6, the security mode is switched. As a result, it is possible to realize appropriate switching of the security mode by interlocking with the lock control of the door.

Also, in the security apparatus 71 according to the embodiment (5), it is judged as to whether or not the door lock control is carried out and further it is judged as to which one of the lock side and the unlock side the door lock control is in by detecting change of a state of the door lock knob in the vehicle. However, a security apparatus according to another embodiment may detect, instead of a change of the state of the door lock knob in the vehicle, a change of states of the locking lever, which is in different states after the time of locking the door lock and after the time of unlocking the door lock.

A security system in which a security apparatus according to an embodiment (6) is employed will be described. Since this security system is of the same structure as that of the security system shown in FIG. 7 except for an security apparatus 71 and a control circuit 72, which makes up the security apparatus 71, different reference numerals are given to a security apparatus and a control circuit, and description of the other components will be omitted here.

Figure 11:
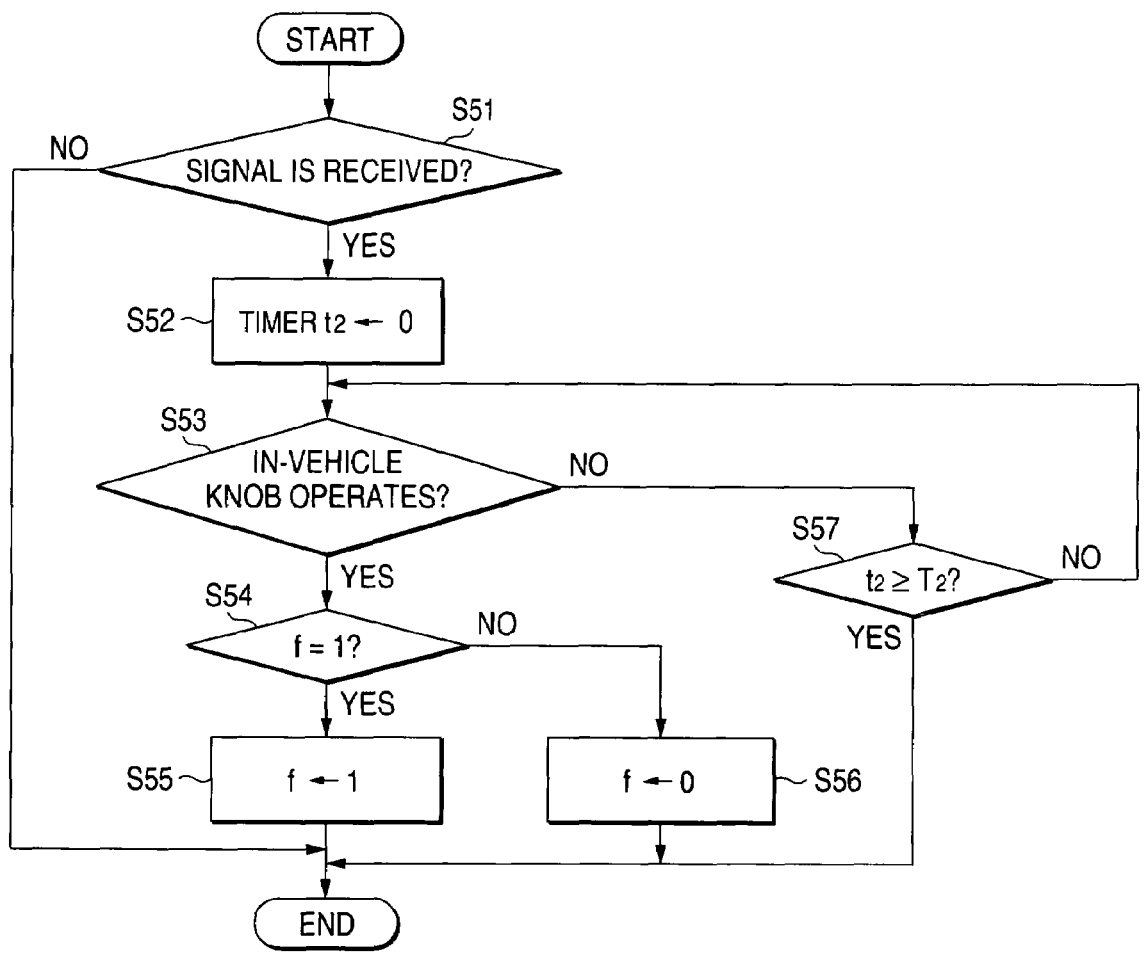
FIG. 11 is a flow chart for showing a processing operation, which is carried out by a control circuit in the security apparatus according to the embodiment (6)

Next, a processing operation (6), which is carried out by a control circuit 82 in a security apparatus 81 according to the embodiment (6), will be described on the basis of a flow chart shown in FIG. 11. Firstly, it is judged as to whether or not the receiving circuit 33 receives a signal (step S51). When it is judged that the receiving circuit 33 receives a signal, i.e., there is a possibility that an instruction signal for instructing door lock control has been transmitted from the portable transmitter 6, a timer $t_2$ is set to 0 and is started (step S52). Next, it is judged as to whether or not the door lock knob in the vehicle, which interlocks with the movement of the locking lever, is moved on the basis of the signal obtained from the knob operation detection sensor 73 (step S53).

When it is judged that the door lock knob in the vehicle is moved, i.e., the locking lever is operated (the door lock control is carried out) by the rotation of the door lock motor 8, it is judged as to whether or not the flag f for setting of the security mode is 1 (step 54). When it is judged that the flag f is 1, the security mode is switched by returning the flag f to 0 to release the security mode (step S55). On the other hand, when it is judged that the flag f is not 1 (that is, 0), the security mode is switched by setting the flag f to 1 to set the security mode (step S56).

Also, in the step S53, when it is judged that the door lock knob in the vehicle is not moved, it is judged as to whether or not the timer $t_2$ has passed over the predetermined period $T_2$ (e.g., 2 seconds) (step S57). When it is judged that the timer $t_2$ has passed over the predetermined period $T_2$, the signal received by the receiving circuit 33 is deemed to be a signal transmitted from another transmitter, which is different from the portable transmitter 6. Then, the processing operation (6) is terminated as it is. On the other hand, when it is judged that the timer $t_2$ has not passed over the predetermined period $T_2$, the process returns to the step S53. Then, it is judged again as to whether or not the door lock knob is moved.

According to the security apparatus 81 of the embodiment (6), when the receiving circuit 33 receives a signal (i.e., there is a possibility that the instruction signal for instructing the door lock control has been transmitted from the portable transmitter 6) and the movement of the door lock knob in the vehicle to the lock position is detected, the security mode is switched.

Accordingly, on the basis of a result of correct judgment as to whether or not the door lock was carried out by the remote control from the transmitter 6, the security mode is switched. As a result, it is possible to realize appropriate switching of the security mode by interlocking with the lock control of the door.

Also, in the security apparatus 81 according to the embodiment (6), it is judged as to whether or not the door lock control is carried out by detecting change of a state of the door lock knob in the vehicle. However, a security apparatus according to another embodiment may detect, instead of a change of the state of the door lock knob in the vehicle, a change of the state of the locking lever and the like.

Also, in the security apparatuses according to the embodiments (1) to (6), it is judged as to whether presence or absence of the possibility that the instruction signal for instructing the door lock control has been transmitted from the portable transmitter 6 on the basis of a reception state in the receiving circuit 33 (e.g., a signal is being received). A result of this judgment is employed for switching control of the security mode. However, a security apparatus according to still another embodiment may judge as to whether or not the instruction signal for instructing the door lock control has been transmitted from the portable transmitter 6 (i.e., this is not presence or absence of the possibility) on the basis of a state of transmission from the receiver control device 1 (for example, transmission of a signal for instructing the door lock control from the receiver control device 1 to the door lock control device 37) and may employ a result of this judgment in switching control of the security mode.

Figure 12:
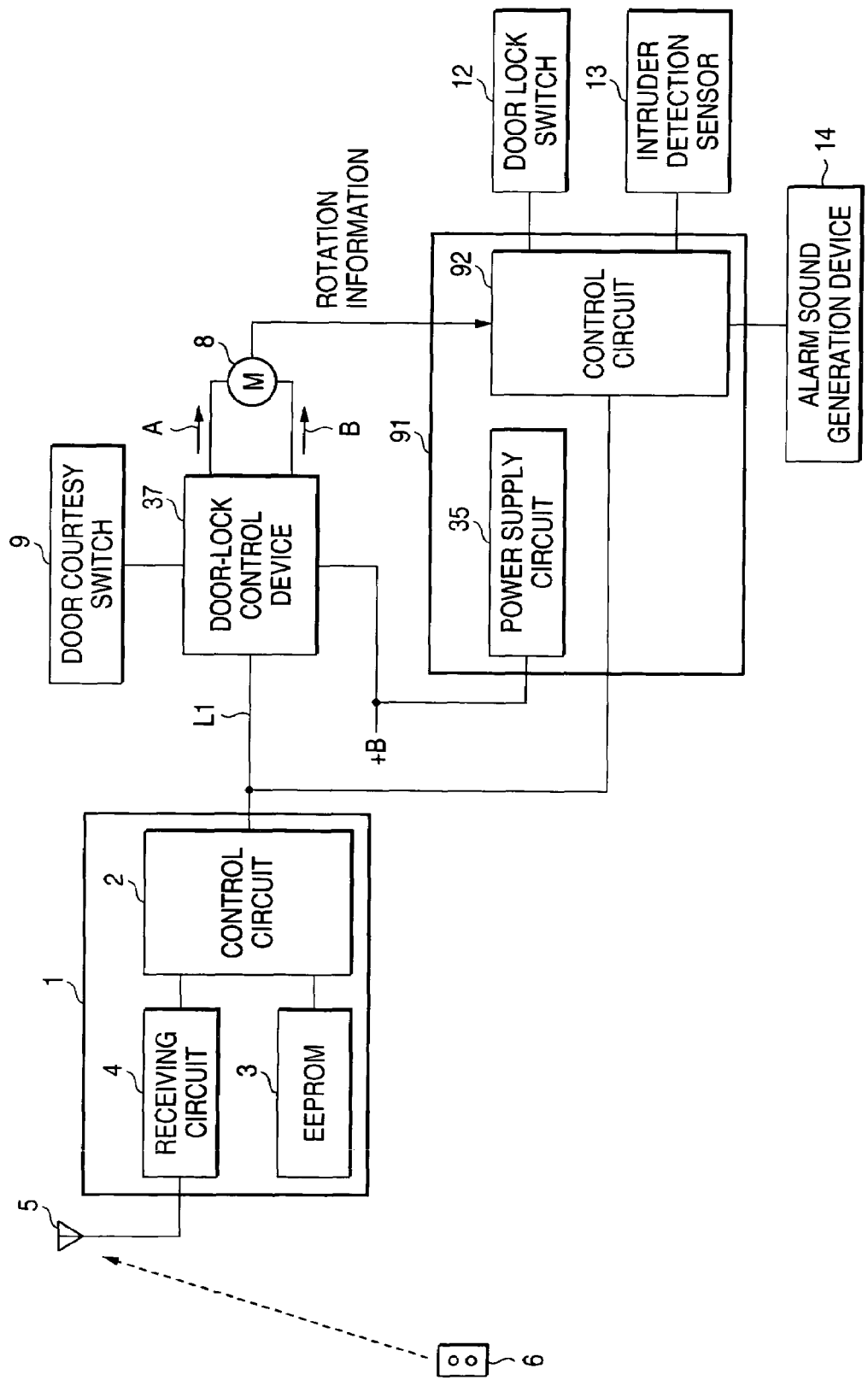
FIG. 12 is a block diagram for schematically showing a main part of a security system in which a security apparatus according to another embodiment is employed.

FIG. 12 is a block diagram for schematically showing a main part of a security system in which a security apparatus according to another embodiment is employed. It should be noted that the same reference numerals and signs are applied to the same structural components as those of the security system shown in FIG. 1, and description thereof will be omitted here.

In the figure, reference numeral 91 designates a security apparatus. The security apparatus 91 includes a control circuit 92 and the power supply circuit 35. The power supply circuit 35 is connected to a battery mounted on a vehicle and supplies electric power to the control circuit 92 and the like in the security apparatus 91.

The control circuit 92 of the security apparatus 91 can acquire information indicating as to whether or not the door lock motor 8 rotates and information concerning the rotational direction thereof as rotation information of the door lock motor 8, which is controlled by the door-lock control device 37. Also; the control circuit 92 is connected to the signal line L1. The control circuit 92 can detect as to whether or not an instruction code such as the lock instruction code to the door-lock control device 37 and the like is supplied from the receiver control device 1 to the signal line L1.

Figure 13:
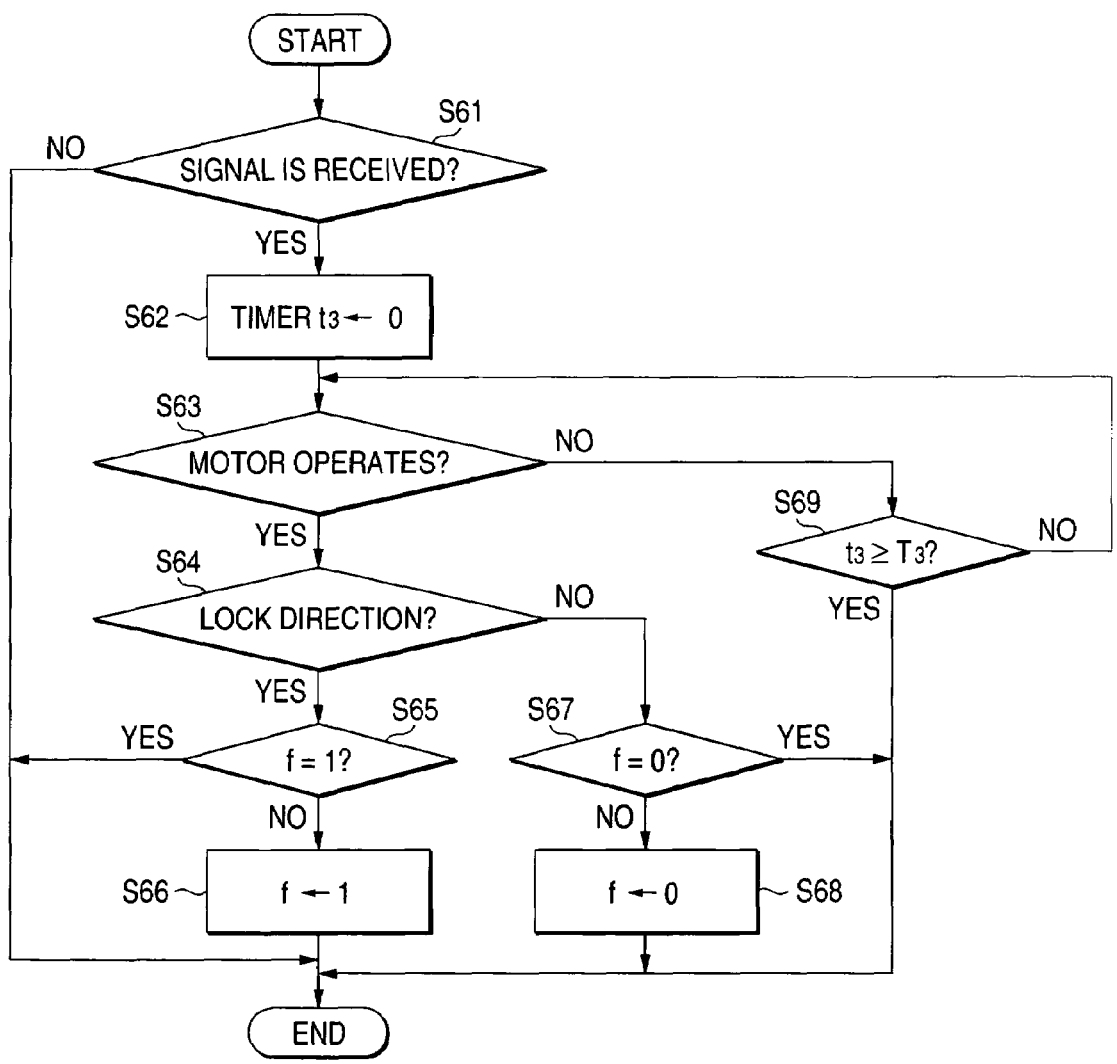
FIG. 13 is a flow chart for showing a processing operation, which is carried out by a control circuit in the security apparatus according to the another embodiment.

Next, a processing operation (7), which is carried out by the control circuit 92 in the security apparatus 91 according to the another embodiment, will be described on the basis of a flow chart shown in FIG. 13. Firstly, it is judged as to whether or not an instruction code such as the lock instruction code is supplied from the receiver control device 1 to the signal line L1 (step S61). When it is judged that the instruction code is supplied, i.e., the instruction signal for instructing the door lock control has been transmitted from the portable transmitter 6, the timer $t_3$ is set to 0 and is started (step S62). Next, it is judged as to whether or not the door lock motor 8 rotates (e.g., whether or not electric power is supplied to the door lock motor 8) (step S63).

When it is judged that the door lock motor 8 rotates, i.e., the door lock control is carried out, it is judged as to whether or not the door lock motor 8 rotates in the forward direction (that is, the lock direction) (e.g., whether or not current flows through the door lock motor 8 in the direction of the arrow A) (step S64).

When it is judged that the door lock motor 8 rotates in the forward direction, i.e., the door lock motor is in a state of the door lock control toward the lock side, it is judged as to whether or not the flag f for setting of the security mode is 1 (step S65). When it is judged that the flag f is not 1, the security mode is set by setting the flag f to 1 (step S68). On the other hand, when it is judged that the flag f is 1, i.e., the security mode has already been set, the processing operation (7) is terminated as it is.

On the other hand, in the step S64, when it is judged that the door lock motor 8 does not rotate in the forward direction, but rotates in the reverse direction, i.e., the door lock motor 8 is in a state of the door lock toward the unlock side, it is judged as to whether or not the flag f for setting of the security mode is 0 (step S67). When it is judged that the flag f is not 0, the security mode is released by returning the flag f to 0 (step S68). On the other hand, when it is judged that the flag f is 0, i.e., the security mode has already been released, the processing operation (7) is terminated as it is.

Also, in the step S63, when it is judged that the door lock motor 8 does not rotate, it is judged as to whether or not the timer $t_3$ has passed over a predetermined period $T_3$ (e.g., 1 second) (step S69). When it is judged that the timer $t_3$ has passed over the predetermined period $T_3$, the judged that the instruction code supplied from the receiver control device 1 to the signal line L1 is deemed to be wrong judgment for any reason. Then, the processing operation (7) is terminated as it is. On the other hand, when it is judged that the timer $t_3$ has not passed over the predetermined period $T_3$, the process returns to the step S63. Then, it is judged again as to whether or not the door lock motor 8 rotates.

As described above, the security apparatus 91 does not need the receiving circuit 33, which can receive a signal transmitted from the portable transmitter 6 for remotely operating the door lock and the antenna 34. As a result, it is possible to realize substantial cost reduction.

What is claimed is:

1. A security apparatus adapted to be detachably installed in a vehicle which includes:
   a first receiver which is configured to receive a first signal including a first ID code, which is transmitted from a transmitter;
   a storage storing a second ID code;
   a control unit which is configured to determine whether the first ID code included in the received signal is in conformity with the second ID code stored in the storage, and to output a second signal only when the first ID code is in conformity with the second ID code; and
   a door lock controller which is configured to lock or unlock a door of the vehicle in response to the second signal, the security apparatus comprising:
   a security unit which is configured to switch a security mode between on and off states;
   a second receiver which is configured to directly receive the first signal; and
   a detecting unit which is configured to detect whether the door lock controller locks or unlocks the door when the second receiver receives the first signal,
   wherein when the second receiver receives the first signal and the detecting unit detects that the door lock controller locks the door, the security unit switches the security mode into the on state;
   wherein when the second receiver receives the first signal and the detecting unit detects that the door lock controller unlocks the door, the security unit switches the security mode into the off state; and
   wherein when the second receiver receives the first signal and the detecting unit does not detect that the door lock controller locks or unlocks the door, the security unit does not switch the security mode.

2. The security apparatus according to claim 1,
   wherein the detecting unit detects a variation of a power-supply voltage value supplied from a battery of the vehicle to the door lock controller to detect whether the door lock controller locks or unlocks the door.

3. The security apparatus according to claim 1,
   wherein the detecting unit detects a variation of a current value supplied from a battery of the vehicle to the door lock controller to detect whether the door lock controller locks or unlocks the door.

4. The security apparatus according to claim 1,
   wherein the detecting unit detects an operation sound of a door lock member of the vehicle to detect whether the door lock controller locks or unlocks the door.

5. A security apparatus adapted to be detachably installed in a vehicle which includes:
   a receiver which is configured to receive a first signal including a first ID code, which is transmitted from a transmitter;
   a storage storing a second ID code;
   a control unit which is configured to determine whether the first ID code included in the received signal is in conformity with the second ID code stored in the storage, and to output a second signal only when the first ID code is in conformity with the second ID code; and
   a door lock controller which is configured to lock or unlock a door of the vehicle in response to the second signal, the security apparatus comprising:
   a security unit which is configured to switch a security mode between on and off states;
   a first detecting unit which is configured to detect whether the control unit outputs the second signal;
   a second detecting unit which is configured to detect whether the door lock controller locks or unlocks the door when the first detecting unit detects that the control unit outputs the second signal;
   wherein when the first detecting unit detects that the control unit outputs the second signal and the second detecting unit detects that the door lock controller locks the door, the security unit switches the security mode into the on state;
   wherein when the first detecting unit detects that the control unit outputs the second signal and the second detecting unit detects that the door lock controller unlocks the door, the security unit switches the security mode into the off state; and
   wherein when the first detecting unit detects that the control unit outputs the second signal and the second detecting unit does not detect that the door lock controller locks or unlocks the door, the security unit does not switch the security mode.

6. The security apparatus according to claim 5,
   wherein the second detecting unit detects a variation of a power-supply voltage value supplied from a battery of the vehicle to the door lock controller to detect whether the door lock controller locks or unlocks the door.

7. The security apparatus according to claim 5,
   wherein the detecting unit detects a variation of a current value supplied from a battery of the vehicle to the door lock controller to detect whether the door lock controller locks or unlocks the door.

8. The security apparatus according to claim 5,
   wherein the second detecting unit detects an operation sound of a door lock member of the vehicle to detect whether the door lock controller locks or unlocks the door.

9. The security apparatus according to claim 8, wherein:
   the second detecting unit includes a microphone and a sound process section;
   the microphone is operable to convert the operation sound of the door lock member into an electric signal; and
   the sound process section is operable to detect whether the door lock controller locks or unlocks the door on the basis of the electric signal.

10. The security apparatus as set forth in claim 5,
    wherein the vehicle further comprises:
    a motor operable to rotate to lock or unlock the door in response to the second signal; and
    a first signal line connecting the control unit and the door lock controller so that the second signal is transmitted therethrough;
    wherein the security apparatus further comprises:
    a second signal line connecting the security unit and the first signal line;
    wherein the second detecting unit detects a rotation of the motor to detect whether the motor locks or unlocks the door; and
    wherein the first detecting unit detects the second signal through the second signal line to detect whether the control unit outputs the second signal.

* * * * *